(12) United States Patent
Fadel et al.

(10) Patent No.: US 8,651,156 B2
(45) Date of Patent: Feb. 18, 2014

(54) HONEYCOMB STRUCTURES FOR HIGH SHEAR FLEXURE

(75) Inventors: Georges M. Fadel, Clemson, SC (US); Jaehyung Ju, Sungnam (KR); Ashwin Michaelraj, Tamil Nadu (IN); Prabhu Shankar, Mumbai (IN); Joshua D. Summers, Clemson, SC (US); John C. Ziegert, Seneca, SC (US)

(73) Assignees: Compagnie Generale des Etablissements Michelin (FR); Michelin Recherche et Technique S.A. (CH)

( * ) Notice: Subject to any disclaimer, the term of this patent is extended or adjusted under 35 U.S.C. 154(b) by 512 days.

(21) Appl. No.: 12/818,262

(22) Filed: Jun. 18, 2010

(65) Prior Publication Data

US 2011/0030866 A1 Feb. 10, 2011

Related U.S. Application Data

(60) Provisional application No. 61/219,847, filed on Jun. 24, 2009.

(51) Int. Cl.
*B60C 5/00* (2006.01)
*B60C 7/00* (2006.01)
*B60C 19/00* (2006.01)

(52) U.S. Cl.
USPC ............................ 152/450; 152/155; 152/246

(58) Field of Classification Search
None
See application file for complete search history.

(56) References Cited

U.S. PATENT DOCUMENTS 4,169,494 A * 10/1979 Kubica et al. ................. 152/310

5,857,643 A * 1/1999 Czuprynski et al. .......... 242/613
6,769,465 B2 8/2004 Rhyne et al.
7,201,194 B2 4/2007 Rhyne et al.

FOREIGN PATENT DOCUMENTS

EP 0173670 * 3/1986
JP 2004-66854 * 3/2004

OTHER PUBLICATIONS

Machine translation of JP 2004-66854, 2004.*
Machine translation of EP 0173670, 1986.*
Sigmund, O., (2008), "Systematic Design of Metamaterials by Topology Optimization," in *IUTAM Symposium on Modeling Nanomaterials and Nanosystems*, Aalborg, Denmark. pp. 151-159.
Gibson, L. J. and Ashby, M. F., (1997), *Cellular Solids Structure and Properties*, 2nd ed. Cambridge, UK: Cambridge University Press, pp. 69-119.

* cited by examiner

*Primary Examiner* — Justin Fischer
(74) *Attorney, Agent, or Firm* — John Streckler Schwab

(57) ABSTRACT

The present invention provides an improved shear band for use in non-pneumatic tires, pneumatic tires, and other technologies. The improved shear band is uniquely constructed of honeycomb shaped units that can replace the elastomeric continuum materials such as natural or synthetic rubber or polyurethane that are typically used. In particular, honeycomb structures made of high modulus materials such as metals or polycarbonates are used that provide the desired shear strains and shear modulus when subjected to stress. When used in tire construction, improvements in rolling resistance can be obtained because of less mass being deformed and reduced hysteresis provided by these materials. The resulting mass of the shear band is greatly reduced if using low density materials. Higher density materials can be used (such as metals) without increasing mass while utilizing their characteristic low energy loss.

21 Claims, 22 Drawing Sheets

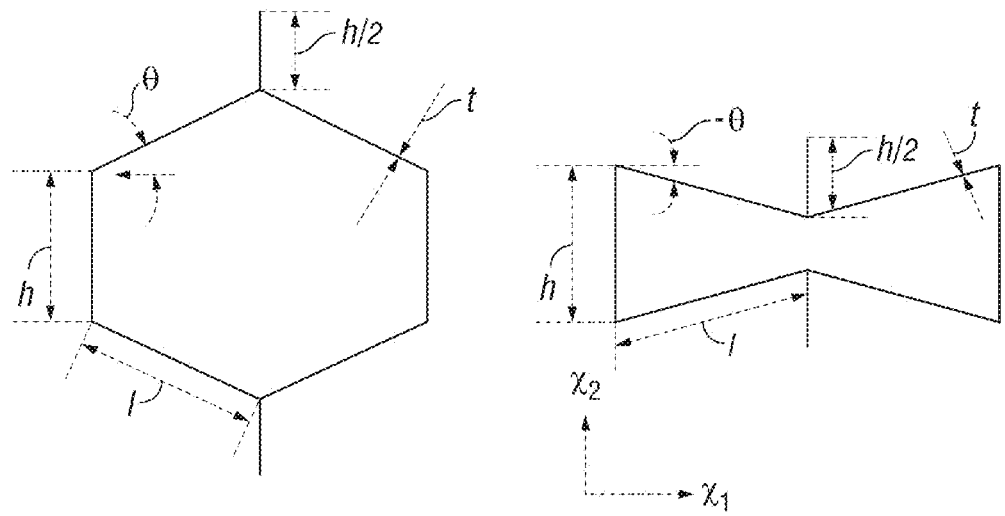
FIG. 1A   FIG. 1B
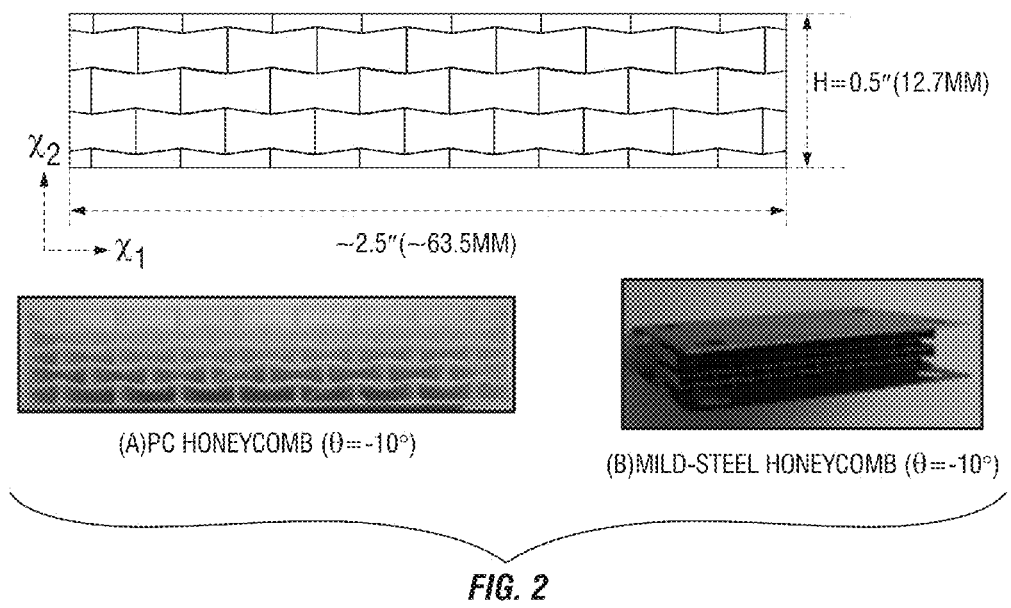
FIG. 2

(A) θ=-20°   (B) θ=-10°   (C) θ=15°   (D) θ=30°   (E) θ=60°

(A) H=4.2MM (B) H=2.1mm (A) H=5.0MM (B) H=2.5MM (A) H=7.7MM (B) H=3.8MM (C) H=2.6MM (A) H=9.7MM (B) H=4.8MM (C) H=3.2MM (D) H=2.4MM (A) H=4.2MM (B) H=2.1MM (A) H = 5.0MM (B) H = 2.5MM (A) H=7.7MM (B) H=3.8MM (C) H=2.6MM (A) H=9.7MM (C) H=3.2MM (D) H=2.4MM

HONEYCOMB STRUCTURES FOR HIGH SHEAR FLEXURE

PRIORITY CLAIM

This application claims the benefit of previously filed U.S. Provisional patent application entitled "Honeycomb Structures for High Shear Flexure", assigned U.S. Ser. No. 61/219,847, filed Jun. 24, 2009, and which is incorporated herein by reference in its entirety for all purposes.

BACKGROUND OF THE INVENTION

1. Field of the Invention

The present invention provides an improved shear band for use in non-pneumatic tires, pneumatic tires, and other technologies. The improved shear band is uniquely constructed of honeycomb shaped units that can replace the elastomeric continuum materials such as natural or synthetic rubber or polyurethane that are typically used. In particular, honeycomb structures made of high modulus materials such as metals or polycarbonates are used that provide the desired shear strains and shear modulus when subjected to stress. When used in tire construction, improvements in rolling resistance can be obtained because of less mass being deformed and reduced hysteresis provided by these materials. The resulting mass of the shear band is greatly reduced if using low density materials. Higher density materials can be used (such as metals) without increasing mass while utilizing their characteristic low energy loss.

2. Description of the Related Art

Those skilled in the art of pneumatic tires have developed a wealth of experience in adapting the tire construction to achieve a variety of performance combinations for tread wear, handling, wet and dry traction, rolling resistance, etc. As an example of this adaptation, a pneumatic or non-pneumatic tire may be optimized for low weight and low hysteresis which results in improved rolling resistance and improved fuel economy. For example, tire designers frequently try to minimize the weight and hysteresis of the materials that constitute the tire.

Non-pneumatic or structurally supported tires have been disclosed in the art. For example, U.S. Pat. No. 6,769,465, commonly owned by the applicant of the present invention, relates to a structurally supported resilient tire that supports a load without internal air pressure. The content of this patent is hereby incorporated by reference in its entirety. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one shear layer, a first membrane adhered to the radially inward extent of the shear layer and a second membrane adhered to the radially outward extent of the shear layer. The invention of U.S. Pat. No. 6,769,465 provides several advantages including, for example, the ability to operate with partial or no inflation pressure and the flexibility to adjust the vertical stiffness of the tire somewhat independently of the ground contact pressure. This invention also provides a relatively well equilibrated contact pressure throughout the contact area.

By way of further example, U.S. Pat. No. 7,201,194, commonly owned by the applicant of the present invention, also relates to a non-pneumatic tire. The content of this patent is also hereby incorporated by reference in its entirety. In an exemplary embodiment, this non-pneumatic tire includes an outer annular shear band and a plurality of web spokes that extend transversely across and radially inward from the annular band and are anchored in a wheel or hub. In certain exemplary embodiments, the annular shear band may further comprise a shear layer, at least a first membrane adhered to the radially inward extent of the shear layer and at least a second membrane adhered to the radially outward extent of the shear layer. In addition to the ability to operate without a required inflation pressure, the invention of U.S. Pat. No. 7,201,194 also provides advantages that include a more uniform ground contact pressure throughout the length of the contact area.

As described for the exemplary embodiments of the references discussed above, both used an annular shear band comprising a shear layer to provide desirable performance benefits in a tire. The shear layer described by these references is composed of an elastomeric material such as natural or synthetic rubber or polyurethane. However, these materials have proven to create more hysteresis and add more weight than desirable which results in a tire having a higher rolling resistance. Accordingly, there is a need for an improved shear layer construction that satisfies the aforementioned need without compromising the shear modulus and shear strains needed in the shear layer in order for the tire to work as intended. As described below, Applicants have discovered an advantageous construction for the shear layer that provides lower weight and hysteresis without compromising other properties that are needed from the shear layer. This improved construction for the shear layer has application in pneumatic tires, non-pneumatic tires, hybrid tires that operate at reduced inflation pressure in conjunction with structural support form an annular band, and other products as well.

SUMMARY OF THE INVENTION

A tire according to an aspect of the present invention has a shear band which comprises a shear layer with a honeycomb structure having at least one cell with a cell height, cell wall thickness, and cell angle.

In some embodiments, the honeycomb structure of the shear layer has at least one cell with a six-sided conventional configuration. In other embodiments, the honeycomb structure of the shear layer has at least one cell with a six-sided auxetic configuration.

The honeycomb structure of the shear layer may be made of a brittle or ductile material. Examples of some brittle materials include mild steel or polycarbonate.

In certain embodiments, the height or thickness of the shear layer is approximately half an inch. In other embodiments, the cell wall thickness ranges from 0.4 to 1.3 mm. This range of cell wall thickness is particularly useful when the shear layer is made of polycarbonate. The cell wall thickness may also be 0.2 mm or less. This range of cell wall thickness is particularly useful when the shear layer is made of mild steel.

In still other embodiments, the cell angle is approximately −10°. In such a case, the cell height may be 7.7 mm, 3.8 mm or 2.6 mm. Sometimes the cell angle is 60°. In such a case, the cell height may be 3.4 mm.

In further embodiments, it is desirable that the honeycomb structure of the shear band of the tire exhibits a 5-8 MPa shear modulus and 15% or lower shear strain when subjected to stress.

This tire may further comprise a first membrane that is adhered to the radially inward extent of the shear layer and a second membrane that is adhered to the radially outward extent of the shear layer. This tire may also further comprise a ground contacting tread portion and sidewall portions that extend radially inward from said tread portion and that is anchored in bead portions that are adapted to remain secure to a wheel during the rolling of the tire. In another situation, the tire may further comprise a plurality of web spokes that extend transversely across and radially inward from the first membrane and that connect the shear layer and first and second membranes to a wheel. This tire may further comprise a tread that is adhered to the radially outward extent of the second membrane.

A shear band according to an aspect of the present invention comprises a shear layer with a honeycomb structure with at least one cell that has a cell wall thickness, cell height and a cell angle. The shear band further comprises a first membrane that is adhered to the radially inward extent of the shear layer and a second membrane that is adhered to the radially outward extent of the shear layer.

In certain cases, the first and second membranes are inextensible.

In other cases, the honeycomb structure of the shear layer has a cell with a six-sided conventional configuration. In such a case, the cell angle may be 60°. In still other cases, the honeycomb structure of the shear layer has a cell with a six-sided auxetic configuration. In such a case, the cell angle may be −10°.

In further embodiments, it is desirable that the honeycomb structure of the shear band exhibits a 5-8 MPa shear modulus and 15% or lower shear strain when subjected to yield stresses.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 1 depicts the Unit Cell Geometry for (a) Conventional and (b) Auxetic Honeycomb Configurations.

FIG. 2 shows a 2D View of a Honeycomb Meta-Material with Built (a) PC and (b) MS Samples.

DETAILED DESCRIPTION OF PARTICULAR EMBODIMENTS

Figure 3:
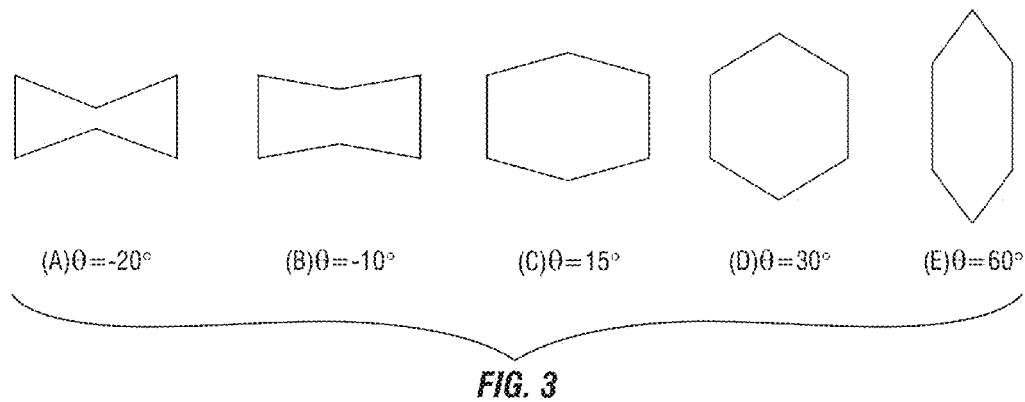
FIG. 3 illustrates Five Honeycomb Configurations Used in this Study when h=1.

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments. One of ordinary skill in the art, using the teachings disclosed herein, will understand that the same or substantially similar features are repeated on both sides of the tire.

DEFINITIONS

The following terms are defined as follows for this disclosure:

"Conventional Honeycomb Configuration", as used herein, means that a polygonal cell such as shown in FIG. 1(a) has a width that contracts when the vertical members shown are pulled in tension.

"Auxetic Honeycomb Configuration" refers to a polygonal cell such as shown in FIG. 1(b) that has a width that expands when the vertical members are pulled in tension.

"Cell Angle $\theta$" means the angle a member of a polygonal cell that is connected to a vertical member such as shown in FIG. 1 forms with the horizontal axis.

"Cell Wall Thickness" means the shortest distance needed to travel from one side of a cell wall to the other side.

DETAILED DESCRIPTION

Introduction

Meta-materials are defined to be engineered materials whose macro-properties are significantly different from the constituent material properties, which are not seen in nature. Examples of meta-materials include elastic materials with negative Poisson's ratio and negative thermal expansion coefficient, electromagnetic band gap materials, and electromagnetic materials with negative permittivity [1]. In the current study, the authors focus on elastic honeycomb structures having positive and negative Poisson's ratio. Constituent unit cells and subsets of unit cells consisting of meta-materials are called meso-structures. The goal was to find a suitable replacement for an elastomer in a shear layer.

In this application, while pursuing the elastomer's in-plane shear modulus, we investigate the effect of various geometric parameters on the in-plane effective elastic properties (Young's and shear moduli) of conventional and auxetic hexagonal honeycombs with PC and MS. Maximum effective shear strains of honeycomb structures are also investigated. Under a given volume, effects of cell heights with five cell configurations and wall thickness on effective properties and maximum effective shear strains are discussed with the two base materials.

Methodology

Due to the high cost of manufacturing honeycomb structures with various geometric options, a numerical parametric study of an analytical model is preferred to an experimental one at the initial stage of design. Therefore, a numerical parametric study with a developed analytical model is employed in the present paper to provide a direction for a prototype design. Hexagonal geometries are easy to handle the Poisson's ratios from positive to negative by changing cell angles, which is good for a parametric study.

A Brief Review of Effective Linear Elastic Properties and Effective Yield Strain Unit cell geometries with conventional and auxetic hexagonal honeycombs are shown in FIG. 1.

The density of the hexagonal honeycombs is given by [2]:

$$\rho^* = \rho \frac{\frac{t}{l}\left(\frac{h}{l} + 2\right)}{2\cos\theta\left(\frac{h}{l} + \sin\theta\right)} \quad (1)$$

Gibson and Ashby's cellular material theory (CMT) has been validated with experimental and numerical works, and describes the honeycombs' elastic behavior well [3-6]. In-plane effective moduli by the CMT are given by [2]:

$$E_{11}^* = E\left(\frac{t}{l}\right)^3 \frac{\cos\theta}{\left(\frac{h}{l} + \sin\theta\right)\sin^2\theta} \quad (2)$$

$$E_{22}^* = E\left(\frac{t}{l}\right)^3 \frac{\left(\frac{h}{l} + \sin\theta\right)}{\cos^3\theta} \quad (3)$$

$$G_{12}^* = E\left(\frac{t}{l}\right)^3 \frac{\left(\frac{h}{l} + \sin\theta\right)}{\left(\frac{h}{l}\right)^2\left(1 + 2\frac{h}{l}\right)\cos\theta} \quad (4)$$

It is hard to find analytical and numerical models of plastic deformation of honeycombs in the literature due to the complexity needed to handle geometric and material nonlinearity. The analytical plastic collapse model by Gibson and Ashby assumes that honeycombs start collapsing plastically when the bending moment in the cell walls reaches the fully plastic moment [2]. Subsequent experimental and FEM simulations of compressive crushing of a honeycomb were carried out by Parka et el. and Atli et al., respectively [22, 23].

CMT using the standard beam theory provides a yield point of honeycombs as a function of materials' strength over a material's linear elastic range. Maximum in-plane effective strains at which the cellular meso-structures can tolerate deformation without local cell wall failure when subjected to in-plane loading are given by [2]

$$(\varepsilon_{11}^*)^{Yield} = \frac{\sigma^{Yield}}{E_{11}^*}\left(\frac{t}{l}\right)^2 \frac{1}{2\left(\frac{h}{l} + \sin\theta\right)|\sin\theta|} \quad (5)$$

$$(\varepsilon_{22}^*)^{Yield} = \frac{\sigma^{Yield}}{E_{22}^*}\left(\frac{t}{l}\right)^2 \frac{1}{2\cos^2\theta} \quad (6)$$

$$(\gamma_{12}^*)^{Yield} = \frac{1}{4}\frac{\sigma^{Yield}}{G_{12}^*}\left(\frac{t}{l}\right)^2 \frac{1}{\frac{h}{l}\cos\theta} \quad (7)$$

It should be noted that the analytical expressions for the effective properties and maximum effective strains are restricted to be used in the linear elastic range.

Design of Honeycombs at a Given Meso-Structural Dimension

For a shear flexure structural design of honeycomb structures, the height of a honeycomb sample is decided to be 0.5 inch (12.7 mm) in the $x_2$ direction as shown in FIG. 2.

Numerous configurations are available with cell angle, $\theta$, cell height, h, and cell length, l, when designing honeycombs. From the geometric constraint, h≥2l sin θ, the maximum negative cell angle, θ, is −30° when h=l (FIG. 2). However, considering the cell wall thickness (0.1 mm to 20% of h), it doesn't appear to build the auxetic honeycomb configuration of θ=−30°. There are numerous honeycomb geometries available between −20 to 90° when h=l depending on cell angles, θ. In this study, five representative hexagonal configurations are considered and their effective properties with varying cell wall thickness are discussed (FIG. 3). The five discrete models are enough to show a continuous behavior of shear deformation over a range of the cell angles by interpolating and extrapolating the selected cell angles.

When comparing effective properties of one honeycomb with another, the volume or the relative density is normally fixed. In this study, the volume is fixed; more precisely speaking, the honeycomb meta-material's height, H, is fixed to be 0.5 inch (FIG. 2).

Figure 4:
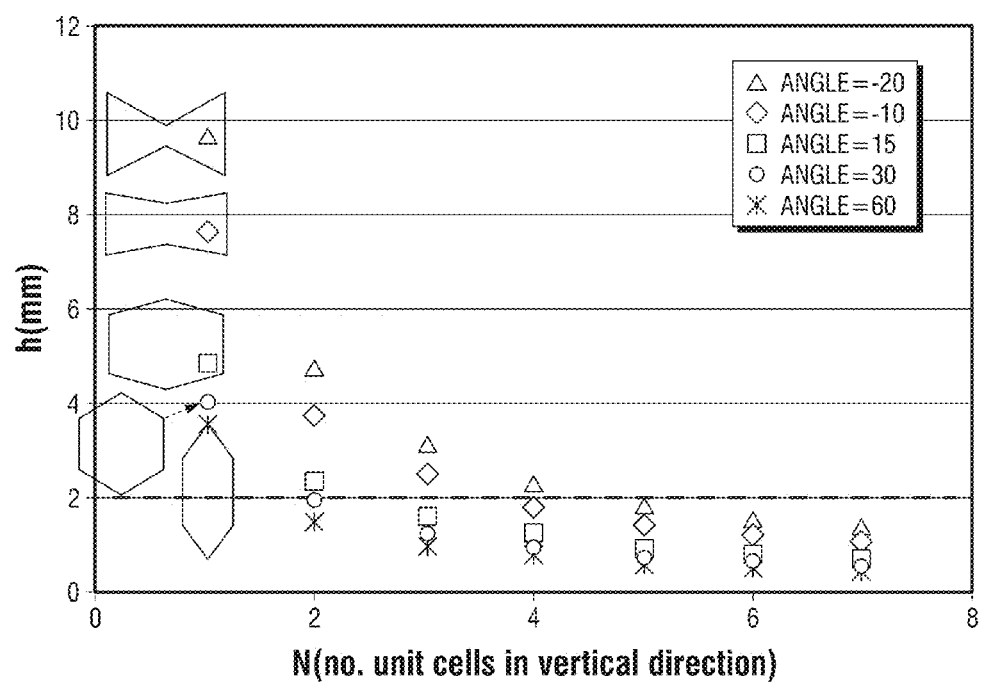
FIG. 4 depicts Cell Heights as a Function of the Number of Unit Cells for Each Honeycomb Configuration (when $\alpha$=1 and H=12.7 mm).

For a given honeycomb of height, H, and cell angle, θ, the cell height h is defined as $$h = \frac{H}{2N(1 + \alpha\sin\theta)} \quad (8)$$

where N is the number of unit cells in the vertical direction (the 2 direction in FIG. 3) and α=l/h. From Equation (8), the cell heights, h, are obtained as a function of the number of unit cells, N, in the vertical direction. In the present study, α is restricted to be 1 for convenience. When α=1 and H=12.7 mm, available cell heights in the design space are plotted in FIG. 4.

Considering a conventional manufacturing limitation, the cell heights should be reasonably high. The lower limit of h is defined to be 2.0 mm in this study. Therefore, the honeycombs with 60° cell angle appear to have only one cell height, 3.4 mm. Design with the configurations of cell angles 30° and 15° shows two cell height options; 4.2 mm and 2.1 mm for 30°, and 5.0 mm and 2.5 mm for 15°. Auxetic honeycombs appear to have more cell height options; 7.7, 3.8, and 2.6 mm for −10° cell angle, and 9.7, 4.8, 3.2, and 2.4 mm for −20° cell angle. Parametric studies of effective moduli with thickness changes are carried out when thickness varies from 0.1 mm to 20% of h, considering a manufacturing limitation.

Results and Discussion

Polycarbonate and mild-steel are known to be representative brittle materials in polymer and metals, respectively. In this study, by showing the worst case of shear flexure design with the brittle materials, a design of meta-materials for shear flexure with ductile materials will be more challenged.

Effective Properties of PC Honeycomb Structures

Polymers can be used as base materials for honeycomb meso-structures. There are several techniques available to manufacture honeycombs with polymers. Extrusion, resin transfer molding, or rapid prototyping (RP) are some of the possible techniques. The part shown in FIG. 2 (a) was prepared with PC using RP. A PC having 2.7 GPa Young's modulus and 0.42 Poisson's ratio is used for a parametric study of cell wall thicknesses on effective properties of honeycomb structures.

Figure 5:
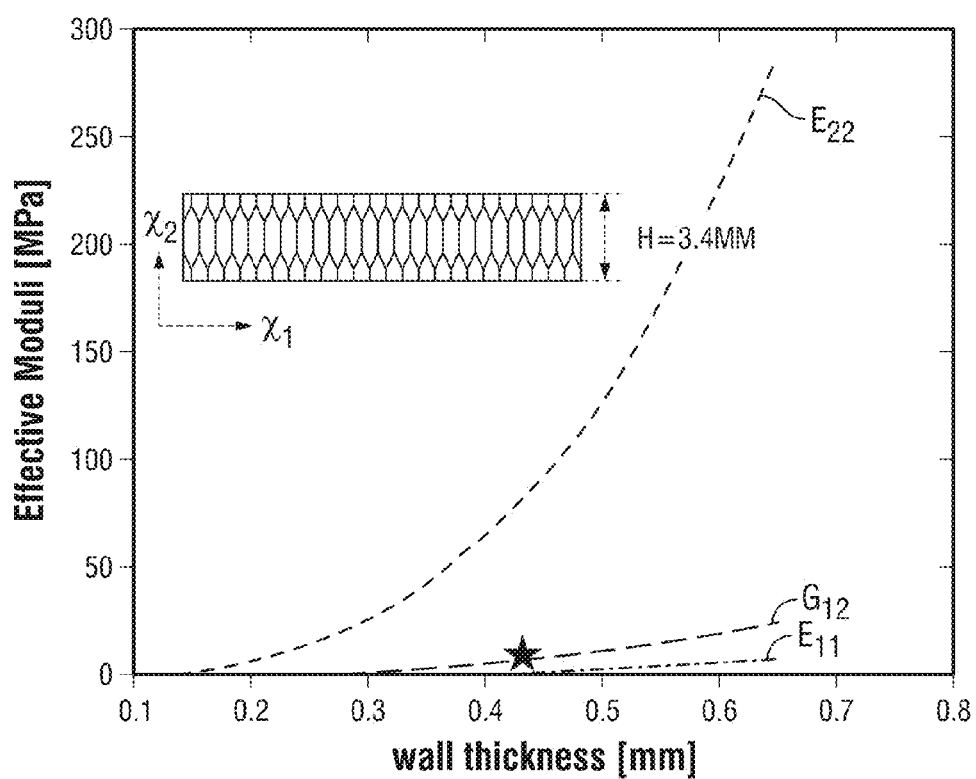
FIG. 5 is a graph showing the Effective Moduli of Honeycombs with 60° Cell Angle (base material: PC).

Effective moduli are obtained for each configuration with an increasing thickness. Only one cell height is available in 60° honeycomb. A target shear modulus of ~6.5 MPa for example is obtained at 0.43 mm cell wall thickness for h=3.4 mm. This configuration may be good for a functional design requiring weak stiffness in the $x_1$ direction and higher stiffness in the $x_2$ direction (FIG. 5).

Figure 6A:
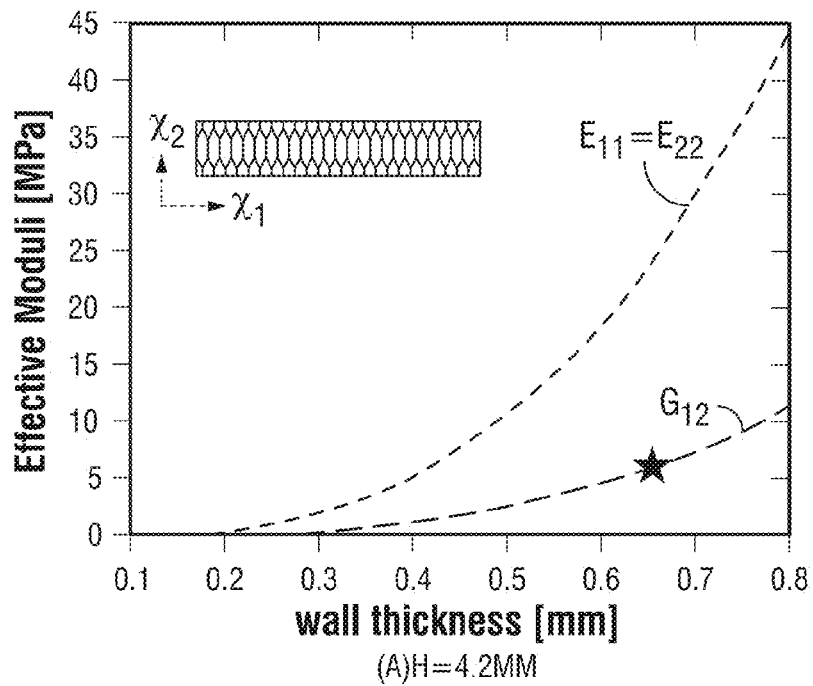
FIG. 6 has graphs showing the Effective Moduli of Honeycombs with 30° Cell Angle (base material: PC).
Figure 6B:
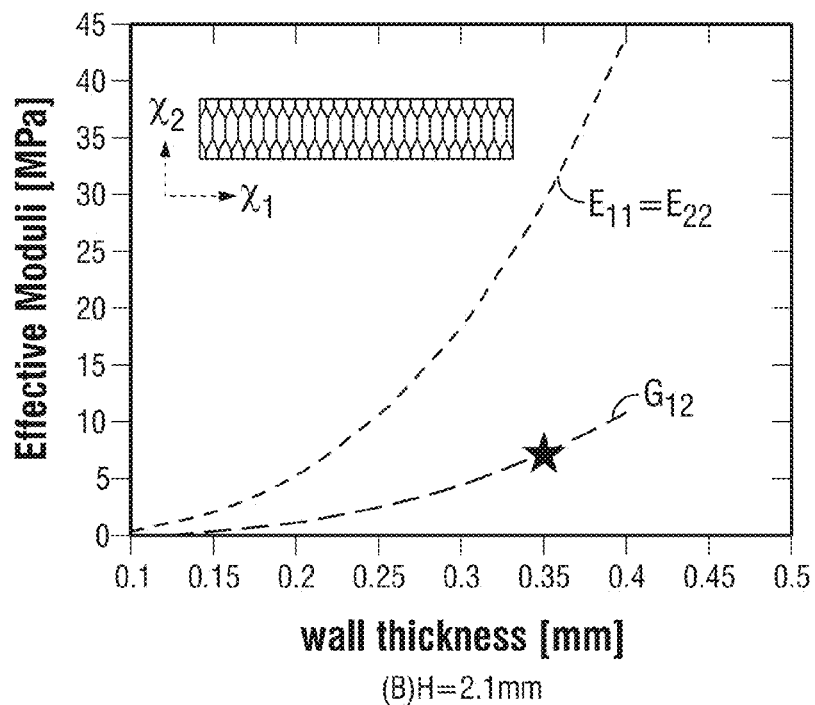

Honeycombs with a 30° cell angle appear to be easy to mimic elastic moduli of polyurethane elastomer. The target shear modulus of ~6.5 MPa is obtained at cell wall thicknesses of around 0.67 mm and 0.35 mm for h=4.2 mm and h=2.1 mm, respectively (FIG. 6). Moreover, the corresponding Young's moduli of both configurations are close to those of polyurethane (~25 MPa), which gives a possibility in designing elastomer-like honeycombs. Note that the cell angle of 30° provides in-plane isotropy, which means $E_{11}$ is equal to $E_{22}$.

Figure 7A:
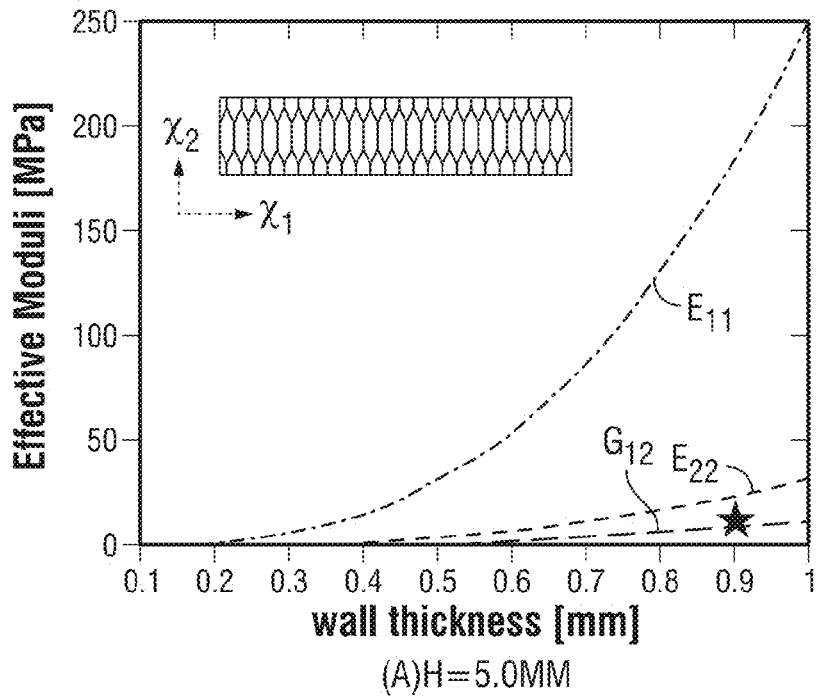
FIG. 7 has graphs showing the Effective Moduli of Honeycombs with 15° Cell Angle (base material: PC).
Figure 7B:
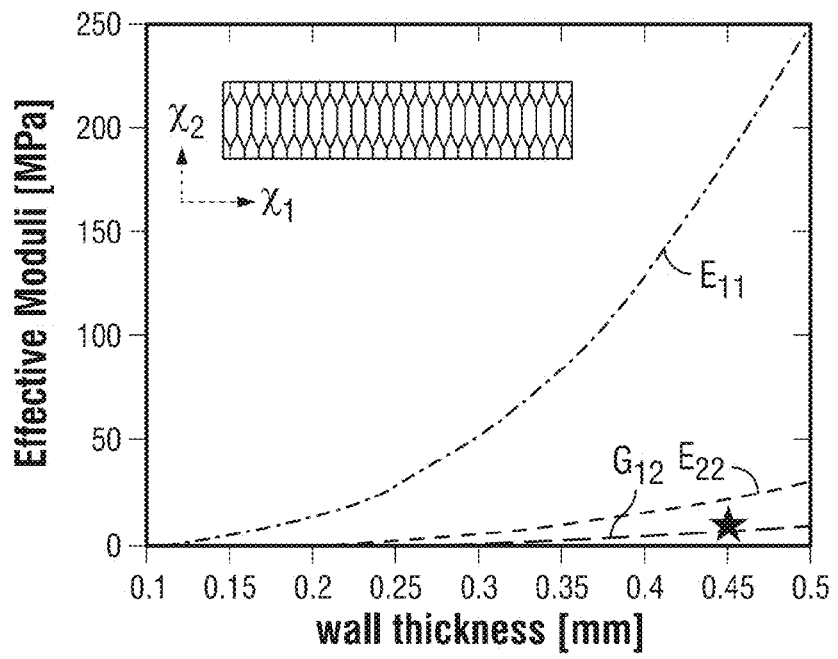

Honeycombs with a 15° cell angle result in 6.84 MPa shear modulus at cell wall thicknesses of 0.9 mm and 0.45 mm for h=5.0 mm and h=2.5 mm, respectively (FIG. 7). Corresponding Young's moduli are 180 MPa in the $x_1$ direction and 21.9 MPa in the $x_2$ direction. Design with 15° cell angle shows interesting results; this honeycomb already has elastomer properties in $G_{12}$ and $E_{22}$. This configuration may give a solution in designing elastomer-like honeycombs having more stiffness in one direction (FIG. 7).

Figure 8A:
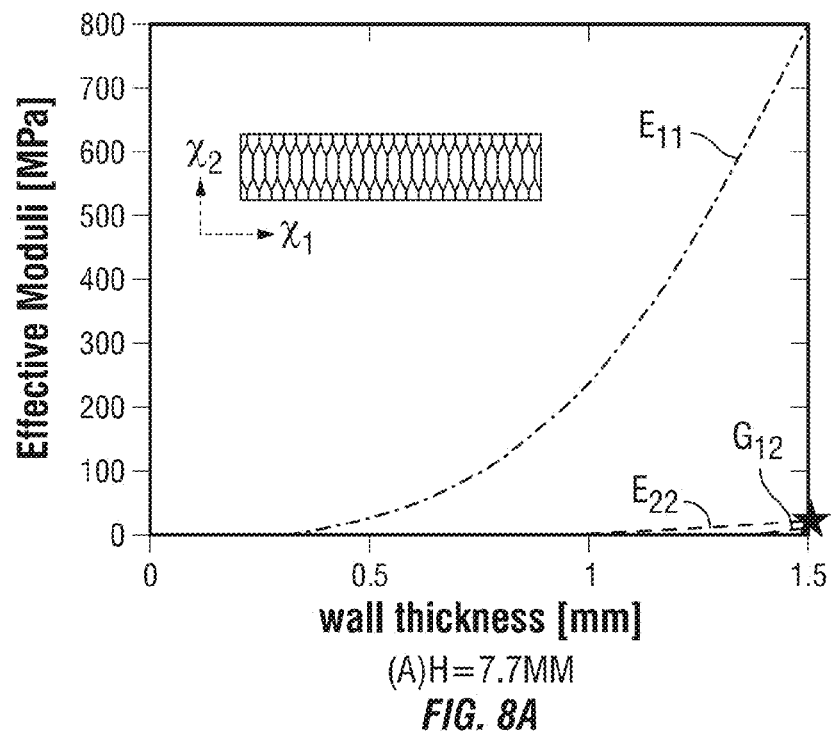
FIG. 8 contains graphs showing the Effective Moduli of Honeycombs with −10° Cell Angle (base material: PC).
Figure 8B:
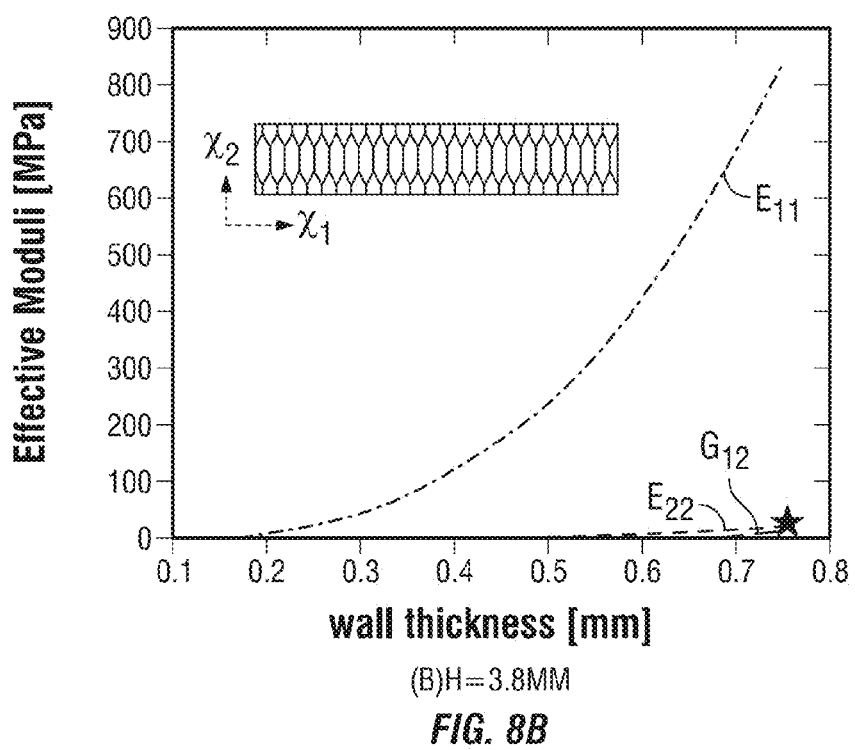
Figure 8C:
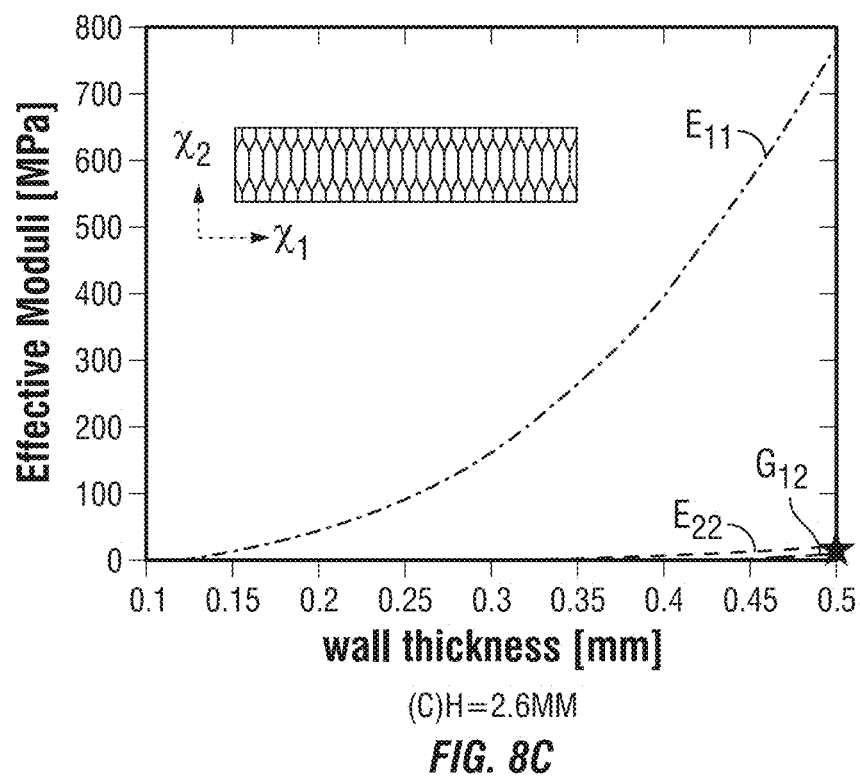
Figure 9A:
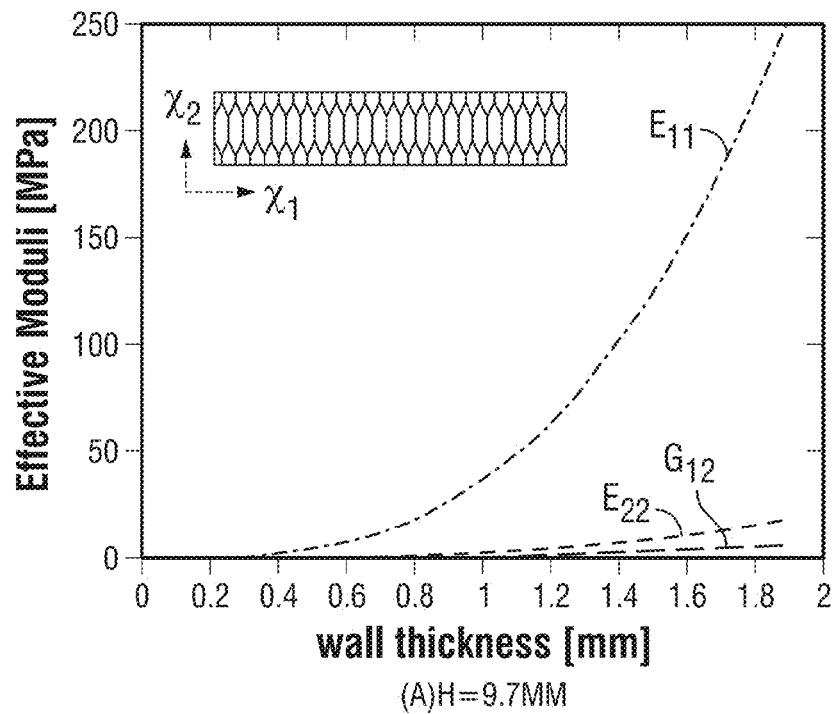
FIG. 9 contains graphs showing the Effective Moduli of Honeycombs with −20° Cell Angle (base material: PC).
Figure 9B:
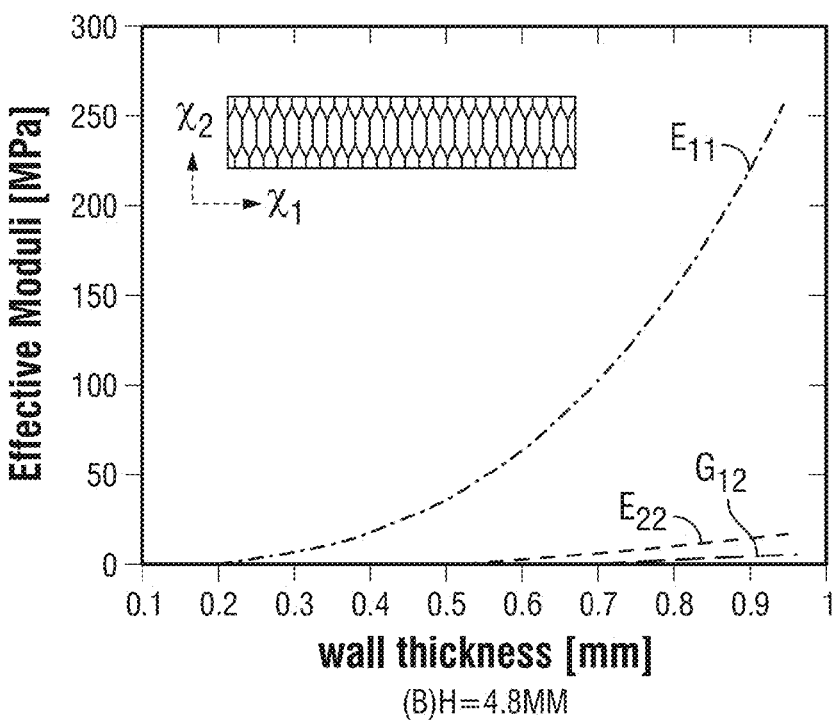
Figure 9C:
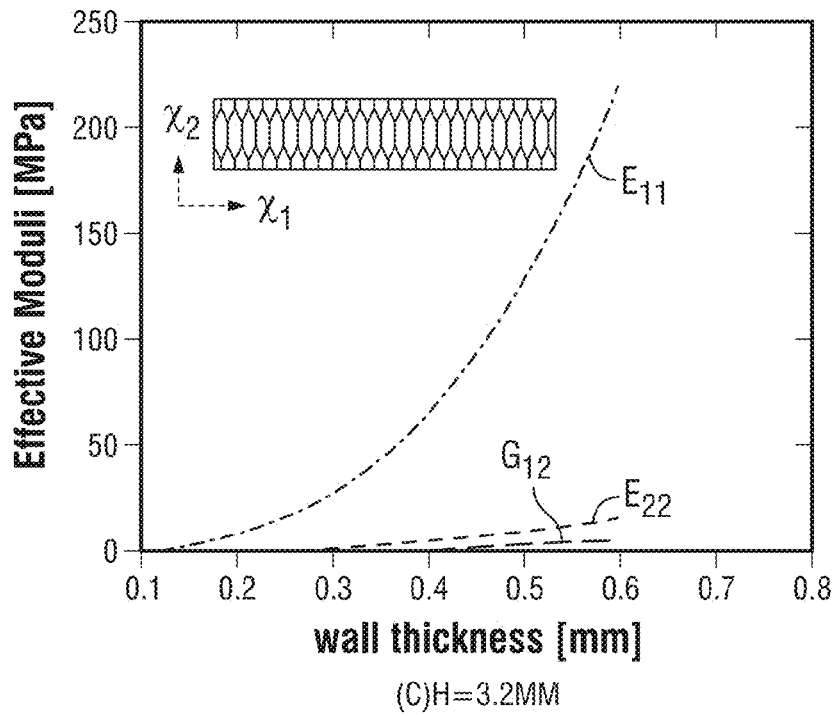
Figure 9D:
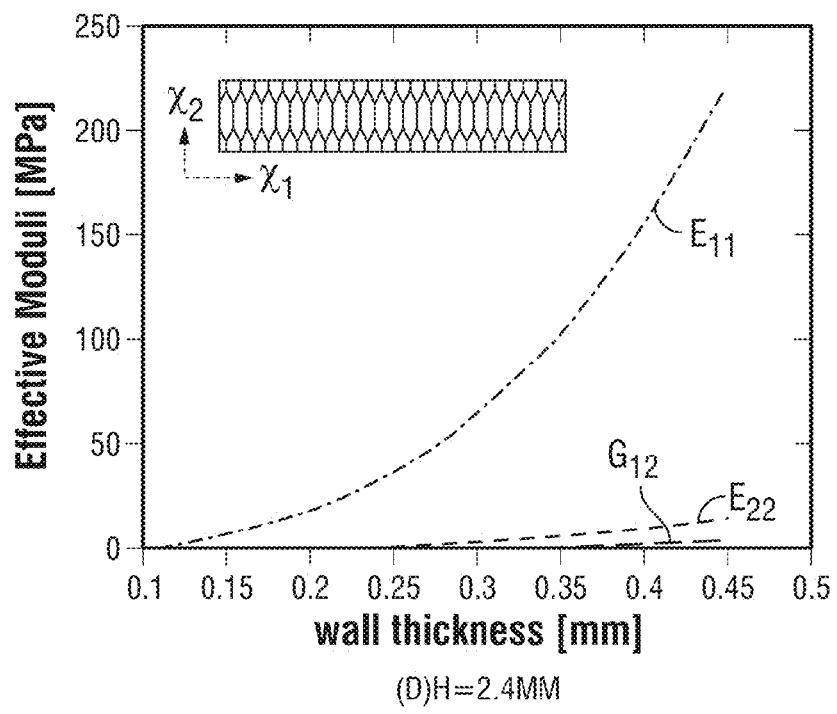

Auxetic honeycombs with cell angle −10° have three cell height choices in the present design space; h=7.7 mm, 3.8 mm, and 2.6 mm (FIG. 8). Maximum shear moduli are between about 5.4 and 5.8 MPa for 0.5 to 1.5 mm wall thicknesses. The shear modulus from our previous test result with the auxetic honeycomb shown in FIG. 2 (h=3.8 mm and 0.53 mm wall thickness) was 2.78 MPa, which matches the plot (b) of FIG. 8. The auxetic design produces an extreme stiffness up to about 800 MPa in the $x_1$ direction while maintaining low moduli in $E_{22}$ and $G_{12}$.

According to the design criteria of the section 2.2, four different cell heights from 2.4 mm to 9.7 mm are available with −20° cell angle as can be seen in FIG. 9. No height options appear to exist for the target shear modulus (~6.5 MPa). Maximum shear moduli are between 4.15 MPa and 4.88 MPa and corresponding $E_{11}$ and $E_{22}$ are about 217 MPa to 240 MPa and 14 MPa to 16 MPa, respectively. Compared to the −10° cell angle design, $E_{11}$ is lowered due to the compliant design with a higher magnitude of negative cell angle.

Effective Properties of MS Honeycomb Structures

Metallic honeycombs can be manufactured using the wire EDM technique and a part manufactured by the technique is shown in FIG. 2 (b). Similar parametric studies of cell wall thickness on effective properties of honeycomb structures are carried out with MS having 210 GPa Young's modulus and 0.29 Poisson's ratio.

Figure 10:
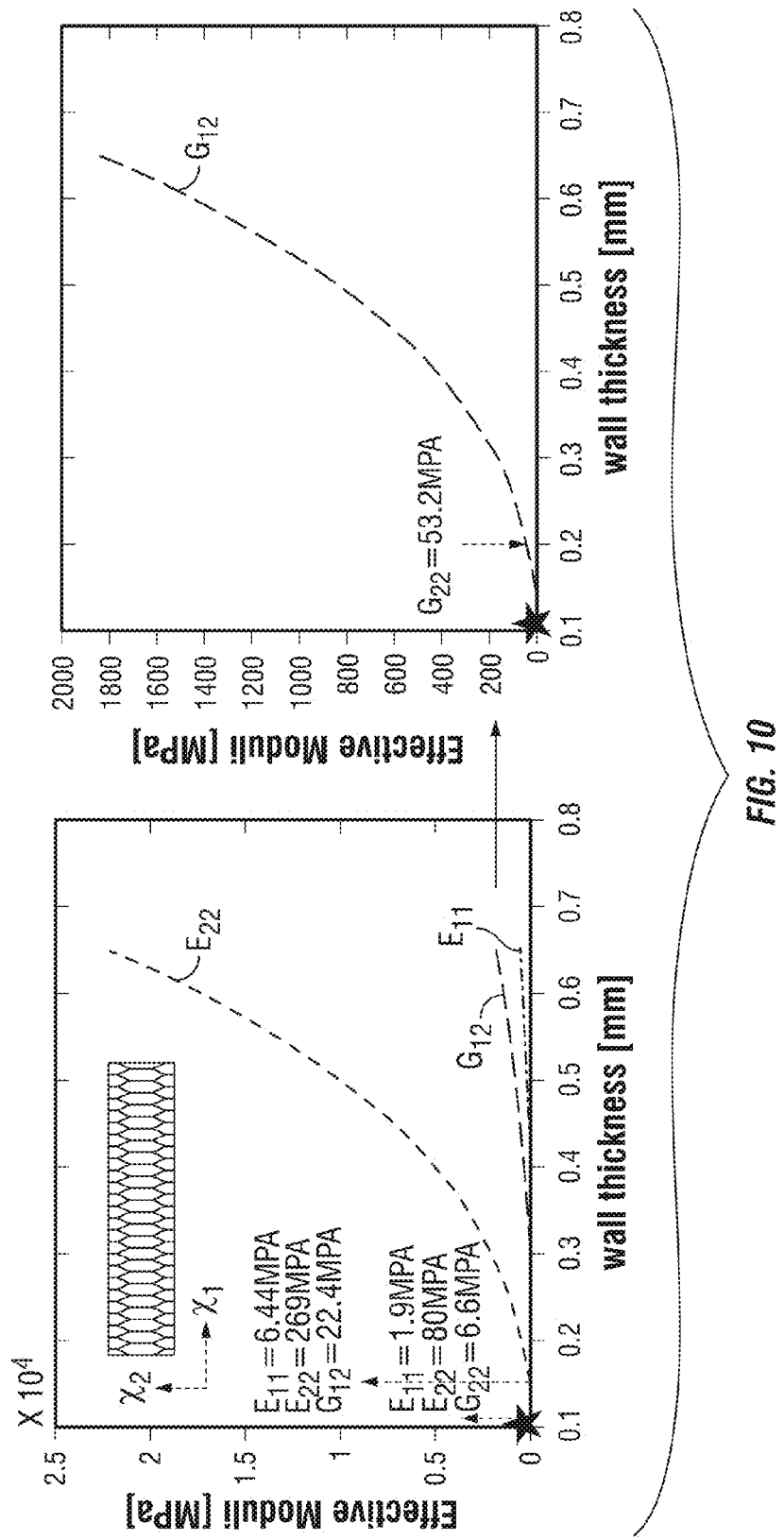
FIG. 10 has graphs showing the Effective Moduli of Honeycombs with 60° Cell Angle (h=3.4 mm, base material: MS).

Again, one cell height (h=3.4 mm) of mild steel is available at the 60° cell angle. A shear modulus of 6.6 MPa is obtained at 0.1 mm wall thickness. The modulus in the $x_2$ direction is more than two orders of magnitude higher than the one in the $x_1$ direction at 0.15 mm or higher wall thickness. Sensitivity seems to be an issue when designing metallic honeycombs; eight times shear modulus increase with a 0.1 mm thickness change as can be seen in FIG. 10.

Figure 11A:
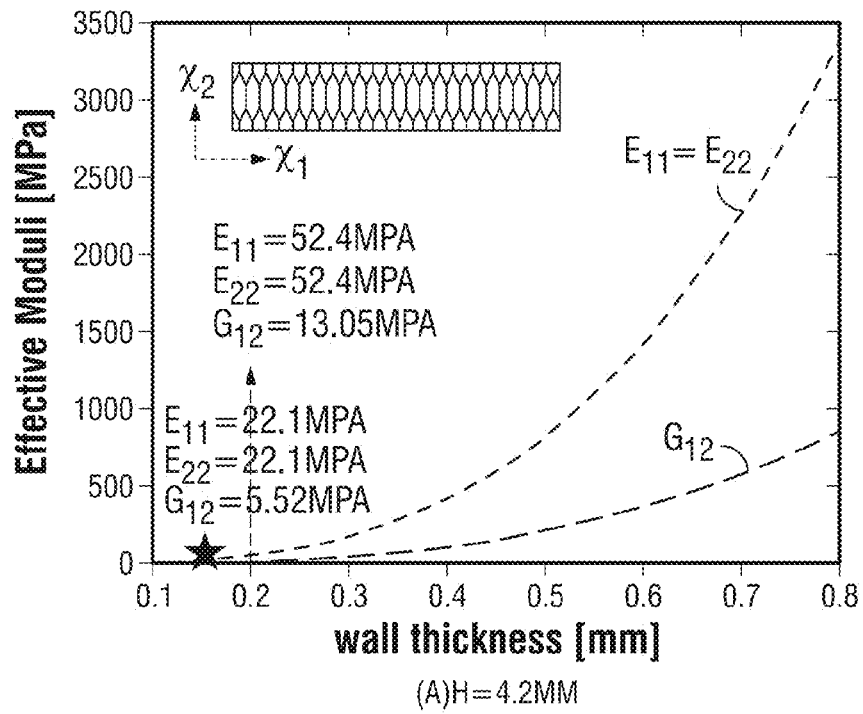
FIG. 11 has graphs showing the Effective Moduli of Honeycombs with 30° Cell Angle (base material: MS).
Figure 11B:
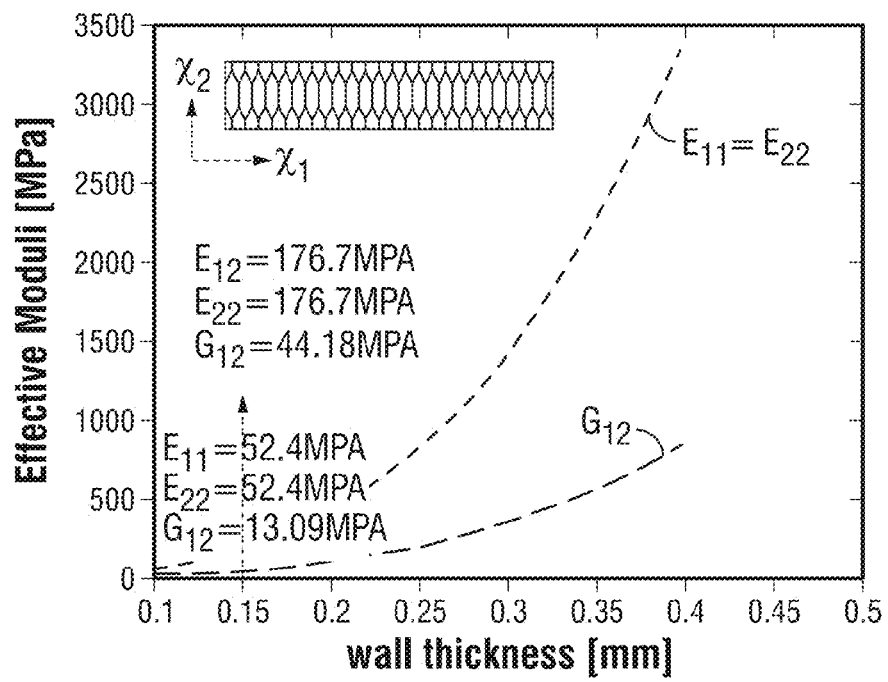

Transverse isotropic properties are obtained with 30° cell angle design. The targeting shear modulus is obtained at 0.15 mm wall thickness for h=4.2 mm as shown in (a) of FIG. 11. There seems to be no solution in the 30° cell angle configuration with the double stack design to reach the target shear modulus as can be shown in (b) of FIG. 11.

Figure 12A:
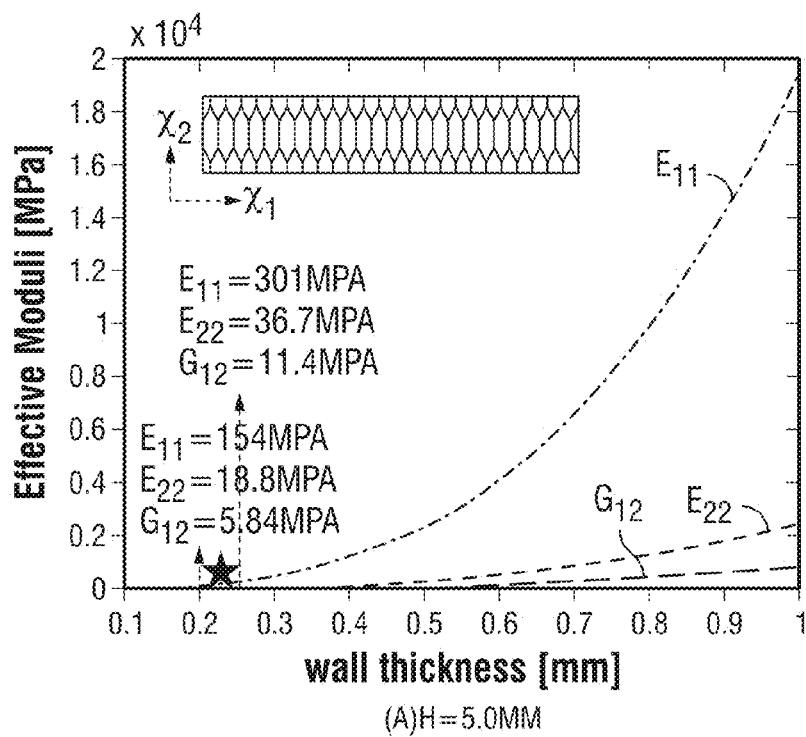
FIG. 12 shows graphs showing the Effective Moduli of Honeycombs with 15° Cell Angle (base material: MS).
Figure 12B:
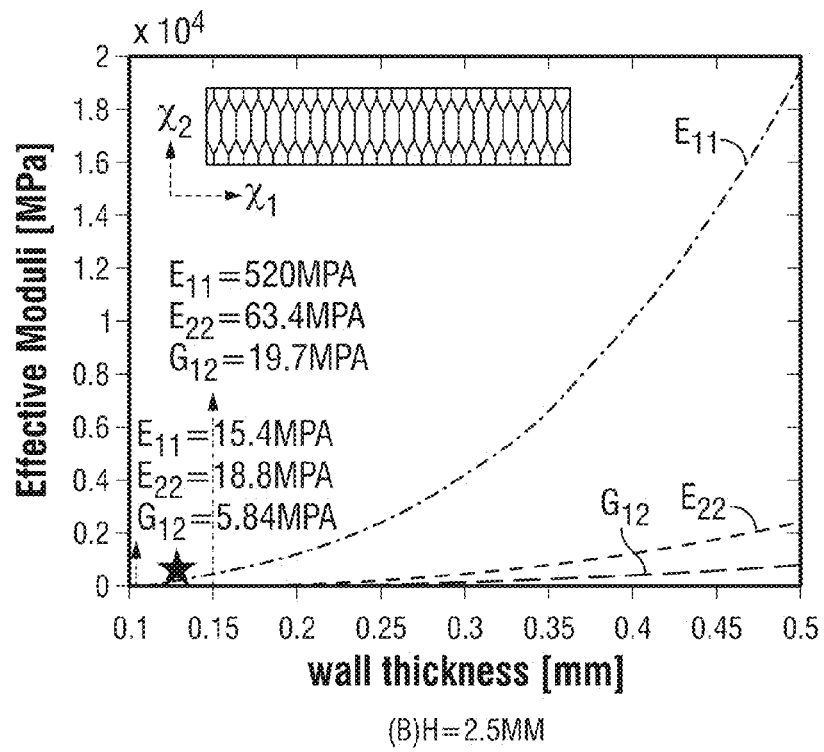

Two cell heights are available for honeycombs with 15° cell angle, as shown by FIG. 12. The target shear modulus is reached at cell wall thickness of 0.22 mm and 0.13 mm for a single unit cell row (h=5.0 mm) and a double unit cell row (h=2.5 mm) design, respectively as shown in FIG. 12. The single unit cell row design with 15° cell angle can reach the target shear modulus with higher thickness than that of the 30° cell angle design but the corresponding Young's modulus, $E_{11}$ is four orders of magnitude higher than the shear modulus.

Figure 13A:
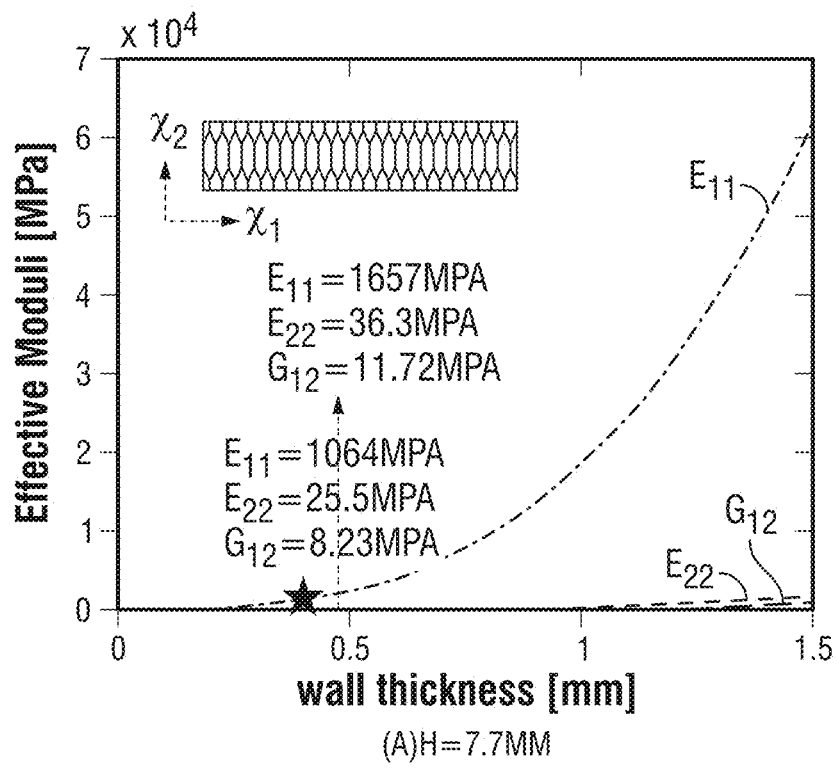
FIG. 13 has graphs showing the Effective Moduli of Honeycombs with −10° Cell Angle (base material: MS).
Figure 13B:
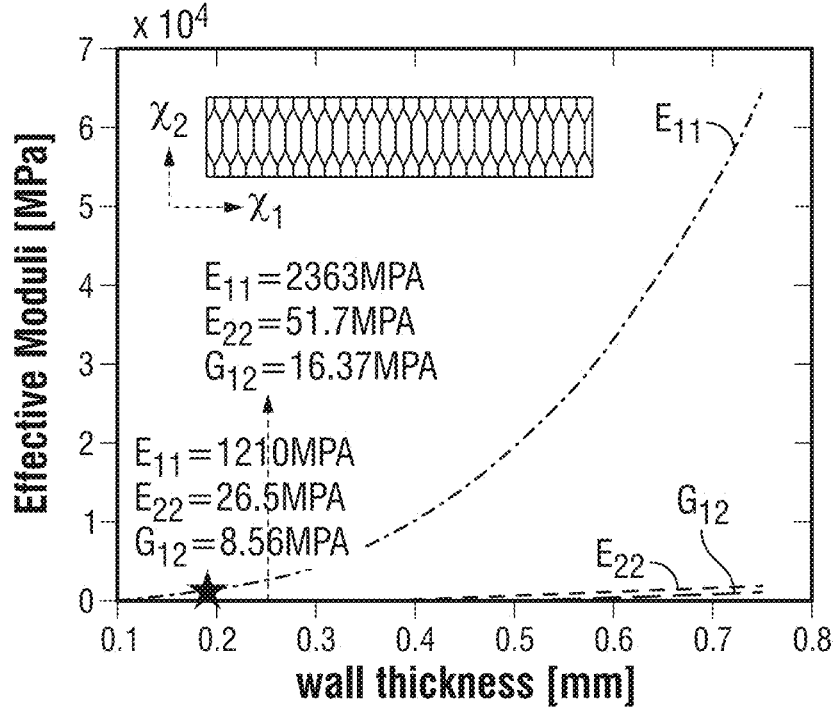
Figure 13C:
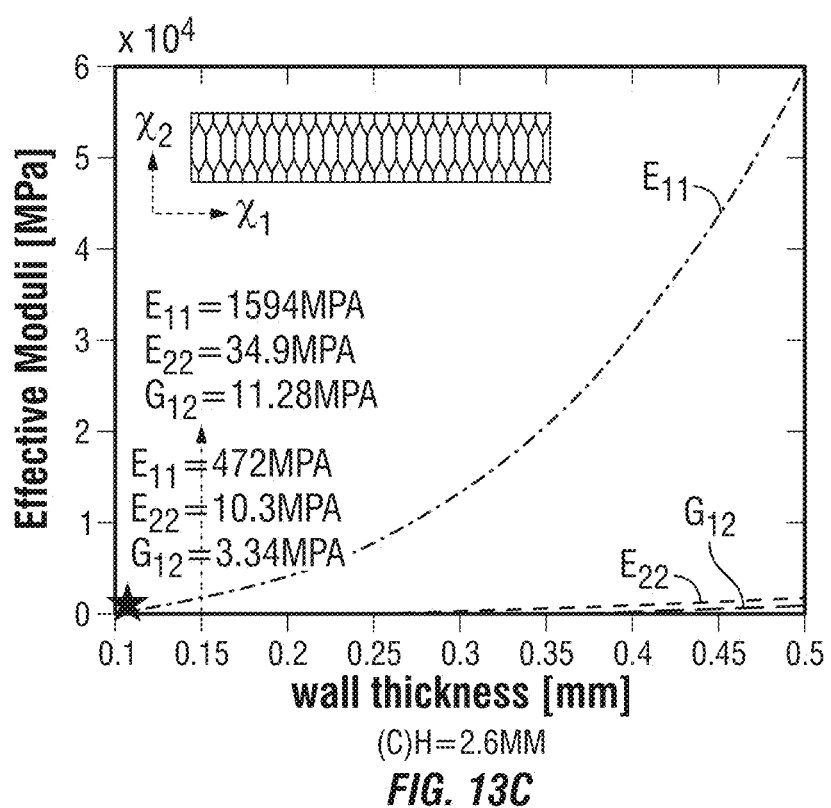
Figure 14A:
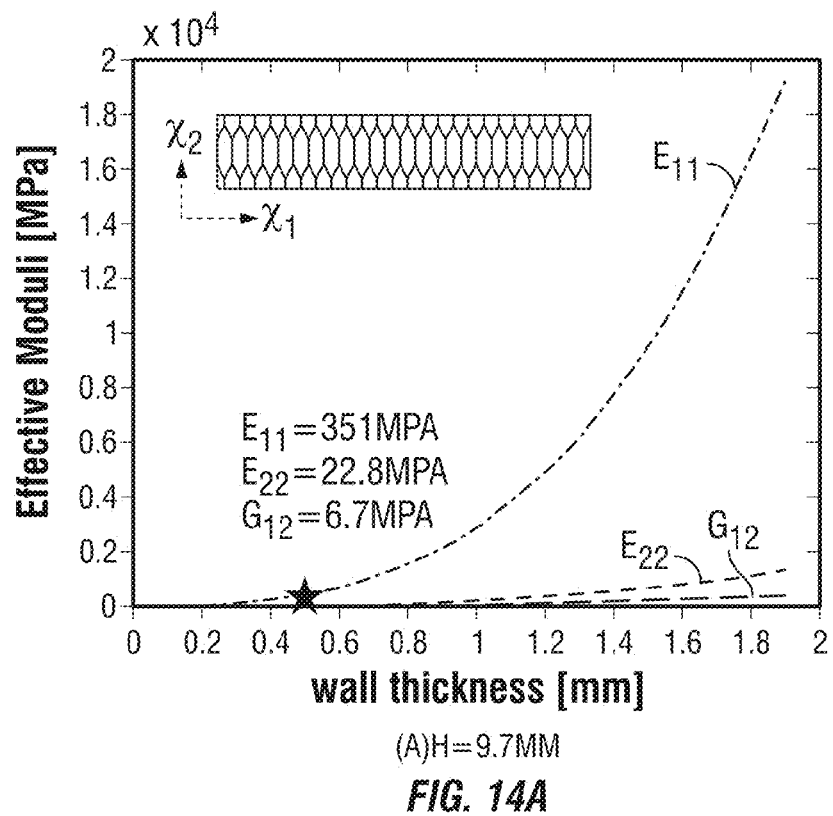
FIG. 14 has graphs showing the Effective Moduli of Honeycombs with −20° Cell Angle (base material: MS).
Figure 14B:
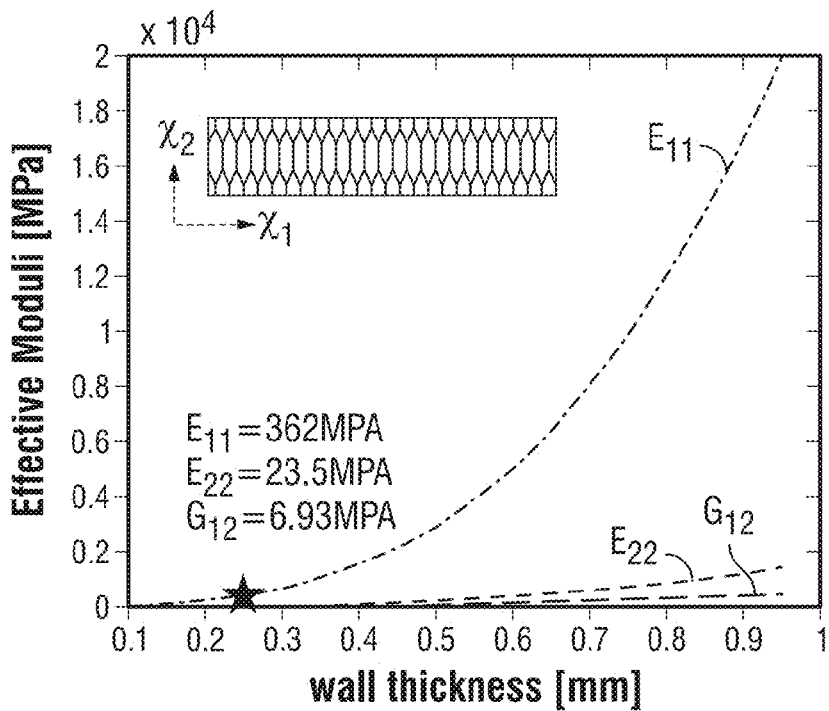
Figure 14C:
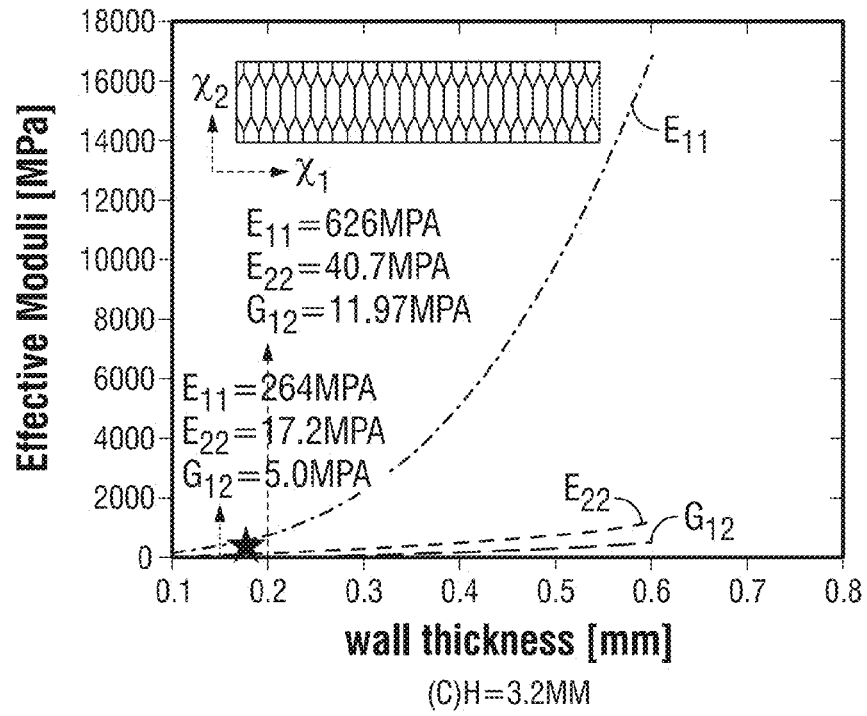
Figure 14D:
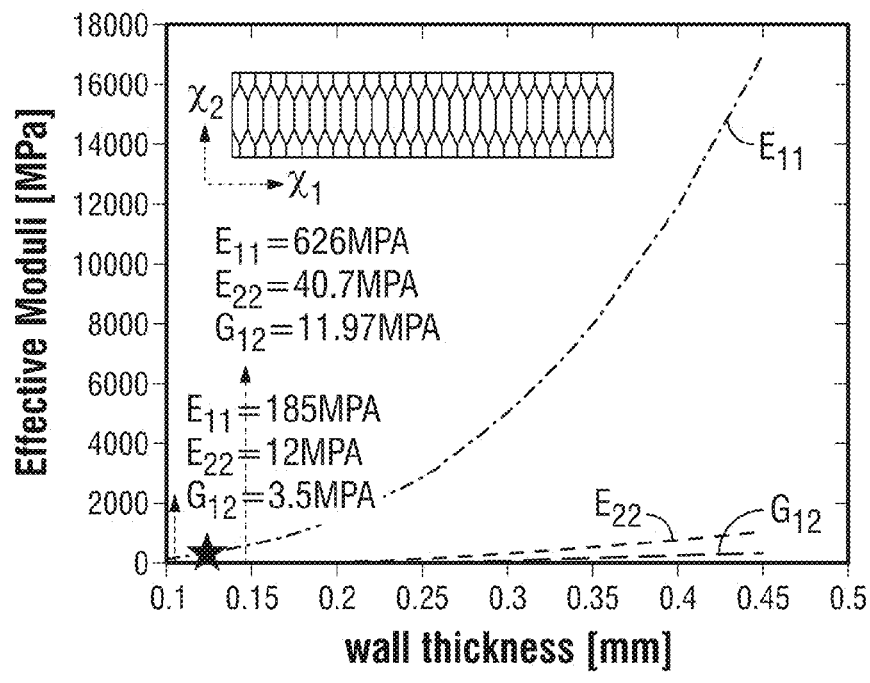

Auxetic honeycomb design with MS and a cell angle of −10° shows a possibility to reach the elastomer's shear modulus with cell wall thicknesses between 0.1 and 0.4 mm depending on the number of unit cells in the $x_2$ direction as shown in FIG. 13. The auxetic design with MS also has an issue of sensitivity of thickness. The sensitivity is more serious with increasing number of unit cells in the $x_2$ direction.

Four cell heights are available with the auxetic configuration of −20° cell angle, and the target shear modulus is obtained from all cell heights (FIG. 14). The single unit cell row configuration reaches a 6.7 MPa shear modulus with 0.5 mm cell wall thickness. The other configurations show the possibility of reaching the target shear modulus with cell wall thicknesses between 0.12 mm and 0.25 mms. However, changes of moduli are too sensitive to the wall thickness. For example, the shear moduli are equal to 3.5 MPa with 0.1 mm cell wall thickness and 11.97 MPa with 0.15 mm cell wall thickness for h=2.4 mm, respectively. Another feature on the auxetic honeycomb design with MS is that there is a huge difference between $E_{11}$ and $E_{22}$, e.g., $E_{11}$ is 351 MPa and $E_{22}$ is 22.8 MPa at 0.5 mm wall thickness for h=9.7 mm.

Design of Shear Flexible Honeycomb Structures

Figure 15:
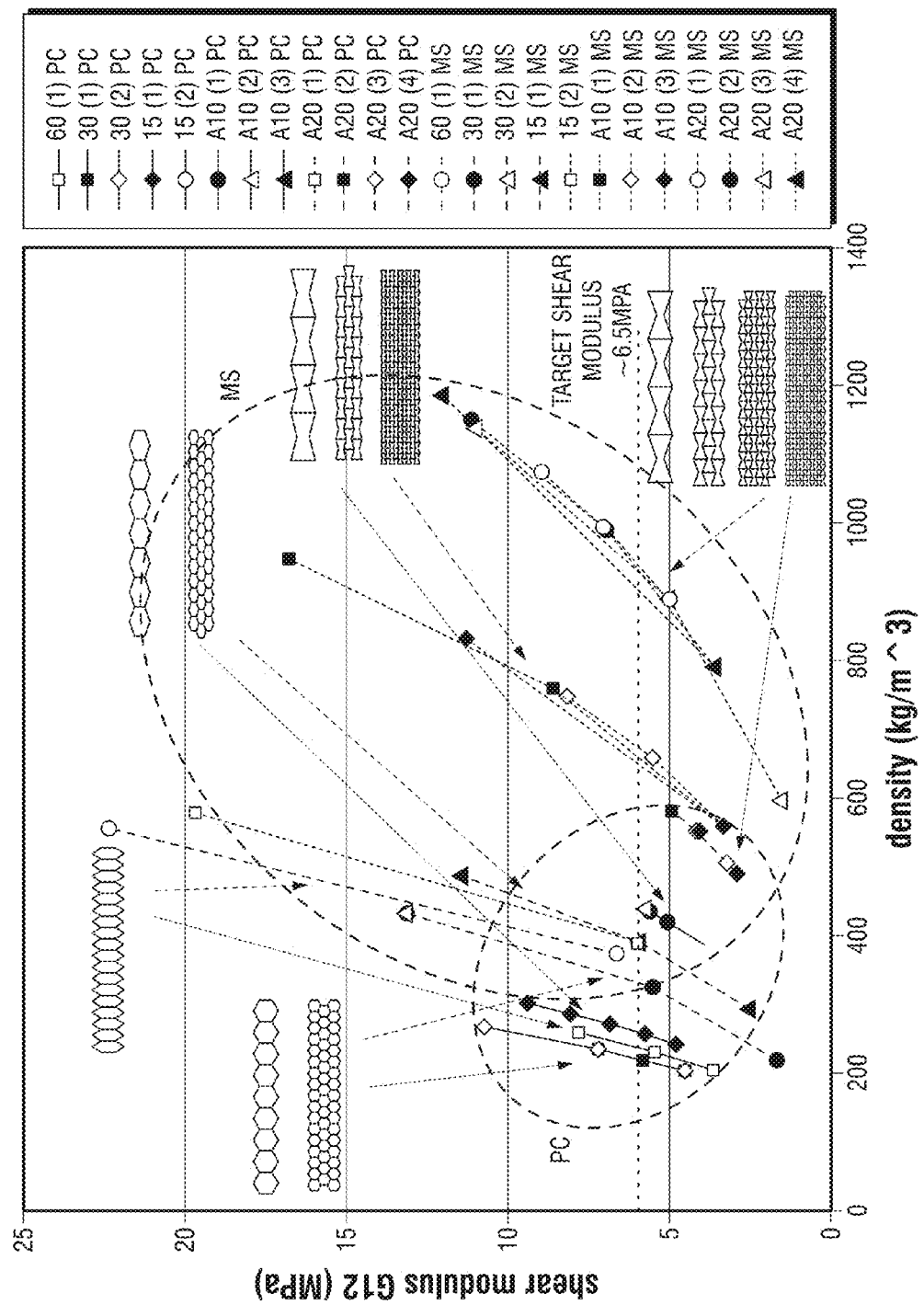
FIG. 15 is a graph showing the Effective Shear Modulus as a Function of Density.

When designing materials, material properties are normally plotted as a function of density like in the Ashby charts [24]. FIG. 15 shows effective shear moduli of PC and MS honeycomb structures as a function of density. Corresponding cell wall thicknesses from lower to upper bounds are shown in Table 1.

All configurations of PC and MS, except PC auxetic honeycombs with θ=−20°, can be designed to reach the effective shear modulus target (~6.5 MPa) with densities between 200 and 400 kg/m³ for PC and between 300 and 1100 kg/m³ for MS, which are lower densities than that of polyurethane (1200 kg/m³).

shear strains due to MS's lower yield strain, 0.1%. Generally, relative density, effective properties, and yield strength of honeycomb structures also increase when cell wall thickness increases. However, there is a trade-off between effective

TABLE 1

Figure 16:
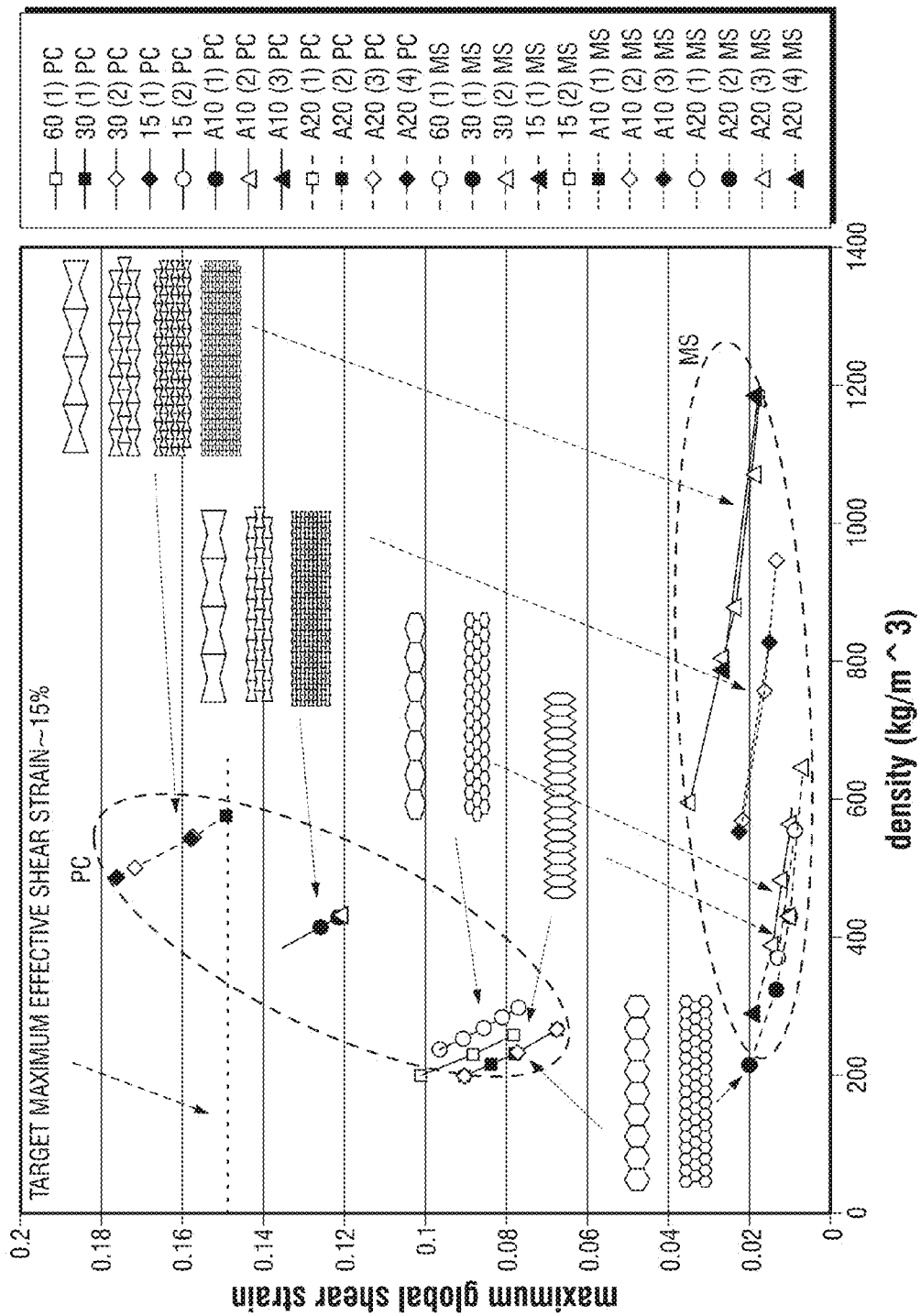
FIG. 16 is a graph showing the Maximum Global Shear Strain as a Function of Density.
Figure 17:
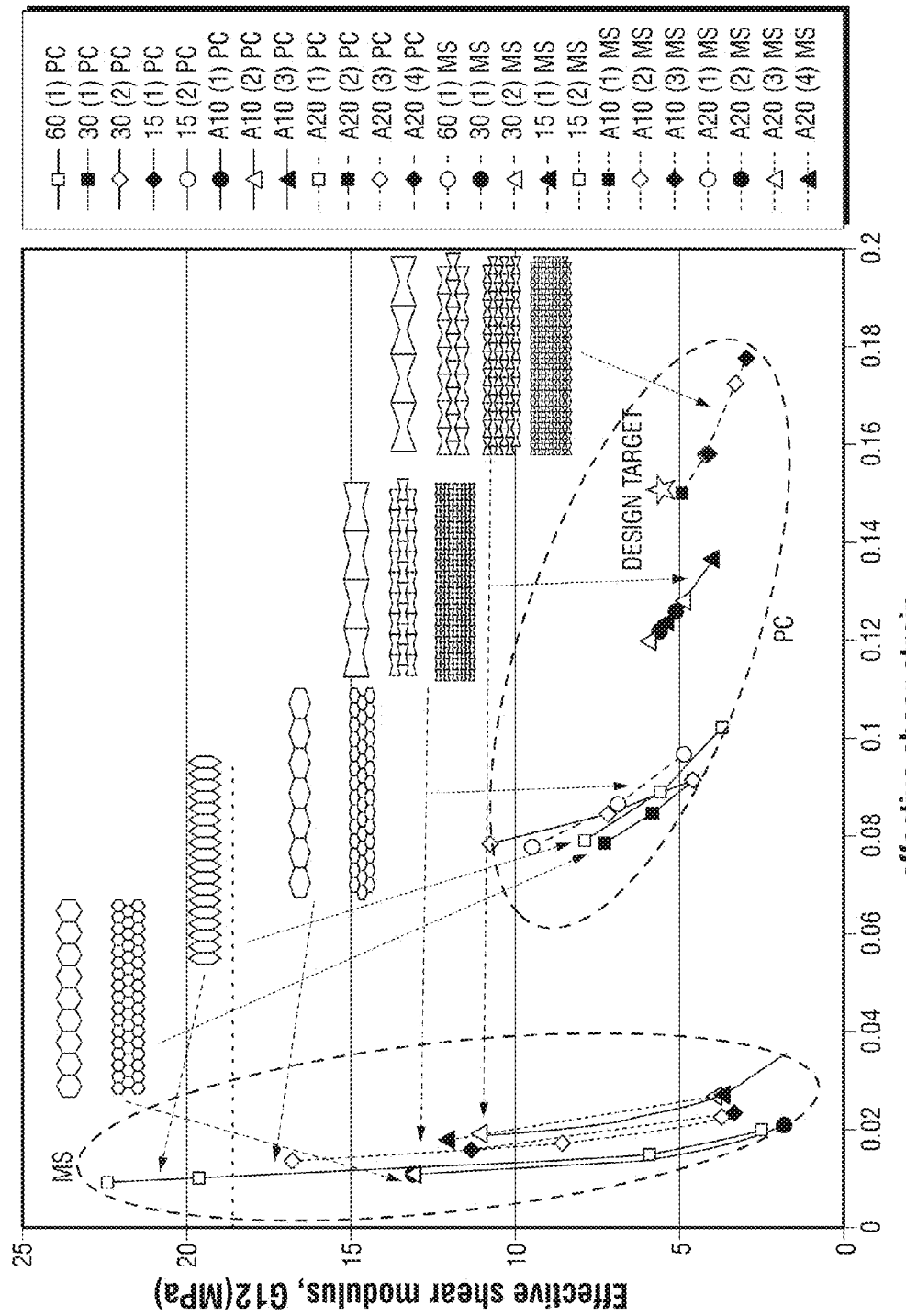
FIG. 17 is a graph illustrating the Maximum Shear Strain-Shear Modulus of a Honeycomb Meta-Material.

Cell Wall Thicknesses in FIGS. 15-17

| Meso-Structure Configuration | Cell wall thickness (PC) [mm] | | | Cell wall thickness (MS) [mm] | | |
|---|---|---|---|---|---|---|
| | lower | middle | upper | lower | middle | upper |
| 60 (1) | 0.35 | 0.4 | 0.45 | N/A | 0.1 | 0.15 |
| 30 (1) | 0.6 | 0.65 | 0.7 | 0.1 | 0.15 | 0.2 |
| 30 (2) | 0.3 | 0.35 | 0.4 | N/A | 0.1 | 0.15 |
| 15 (1) | 0.85 | 0.9 | 0.95 | 0.15 | 0.2 | 0.25 |
| 15 (2) | 0.4 | 0.45 | 0.5 | N/A | 0.1 | 0.15 |
| aux 10 (1) | 1.45 | 1.5 | N/A | 0.3 | 0.35 | 0.4 |
| aux 10 (2) | 0.7 | 0.75 | N/A | 0.15 | 0.2 | 0.25 |
| aux 10 (3) | 0.45 | 0.5 | N/A | N/A | 0.1 | 0.15 |
| aux 20 (1) | 1.85 | 1.9 | N/A | 0.45 | 0.5 | 0.55 |
| aux 20 (2) | 0.9 | 0.95 | N/A | 0.2 | 0.25 | 0.3 |
| aux 20 (3) | 0.55 | 0.6 | N/A | 0.1 | 0.15 | 0.2 |
| aux 20 (4) | 0.4 | 0.45 | N/A | N/A | 0.1 | 0.15 |

When the yield stresses (and corresponding yield strains) of PC and MS are 70 MPa (2.59%) and 200 MPa (0.1%), respectively, FIG. 17 shows maximum effective shear strains of honeycomb structures having the shear modulus (~6.5 MPa) for different cell geometries of PC and MS. PC honeycombs have 8 to 15% maximum global shear strains depending on cell configurations when shear modulus of the metamaterials are about 5 to 6.5 MPa. Compared to PC honeycombs, MS honeycombs have lower maximum global shear strains due to MS's lower yield strain, 0.1%. Generally, relative density, effective properties, and yield strength of honeycomb structures also increase when cell wall thickness increases. However, there is a trade-off between effective modulus and maximum effective strain; when effective modulus increases, maximum effective strain decrease, and vice versa. This is explained in that the higher effective stiffness with an increased cell wall thickness causes higher local cell wall stresses, resulting in lower effective yield strain. FIG. 16 shows that maximum effective shear strains decrease with an increasing cell wall thickness. This can be validated by the fact that strength of honeycombs is proportional to $t^2$ but effective moduli are proportional to $t^3$ in Equations (4) and (7), which give rise to a decrease of maximum effective strains with an increasing wall thickness under the linear elastic assumption.

FIG. 17 is the combined plot of FIG. 15 and FIG. 16 for direct evaluation of the two design targets; effective shear modulus and maximum effective shear strain.

Considering the shear elongation design target (15% maximum effective shear strain), PC auxetic honeycombs (θ=−20°) appear to reach the target while maintaining their limitation on the lower effective shear stiffness. MS honeycombs show only 2% variation of maximum effective strains with meso-structural geometric change, which means that maximum effective shear strains are not quite as affected by configurations of MS due to the low yield strain and high stiffness of MS. Polymers having high modulus and high yield strain and metals having low modulus and high yield strain appear to be candidates for the current design targets.

Figure 18:
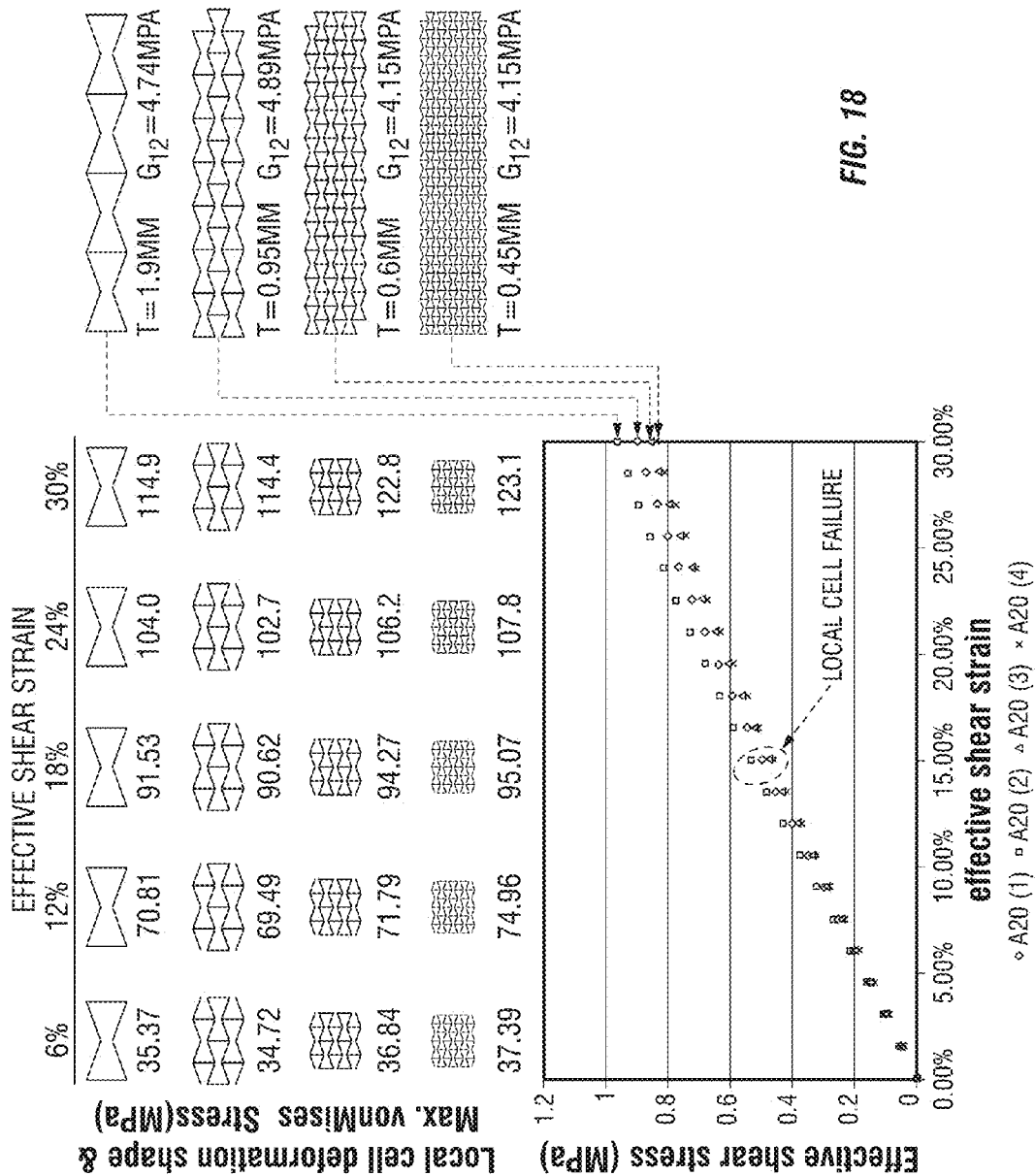
FIG. 18 is a graph depicting the Effective Shear Strain-Stress Curves of Auxetic Honeycombs (Cell Angle $\theta$=−20°) Using Finite Element Simulation.

Effective shear strain-stress curves of auxetic honeycombs (θ=−20°) for the simple shear deformation are plotted using a commercial finite element software, ABAQUS 6.8 to validate the parametric study of the high shear flexural meso-structures as shown in FIG. 18. The shear deformable beam element, B22 in ABAQUS, and elasto-plastic stress-strain data of PC were used for the large shear deformation simulation. The four auxetic configurations show about 15% maximum shear strains where a failure initiates at the vertical cell edges when local Cauchy stresses reach at PC's true yield strength, 81 MPa.

Figure 19:
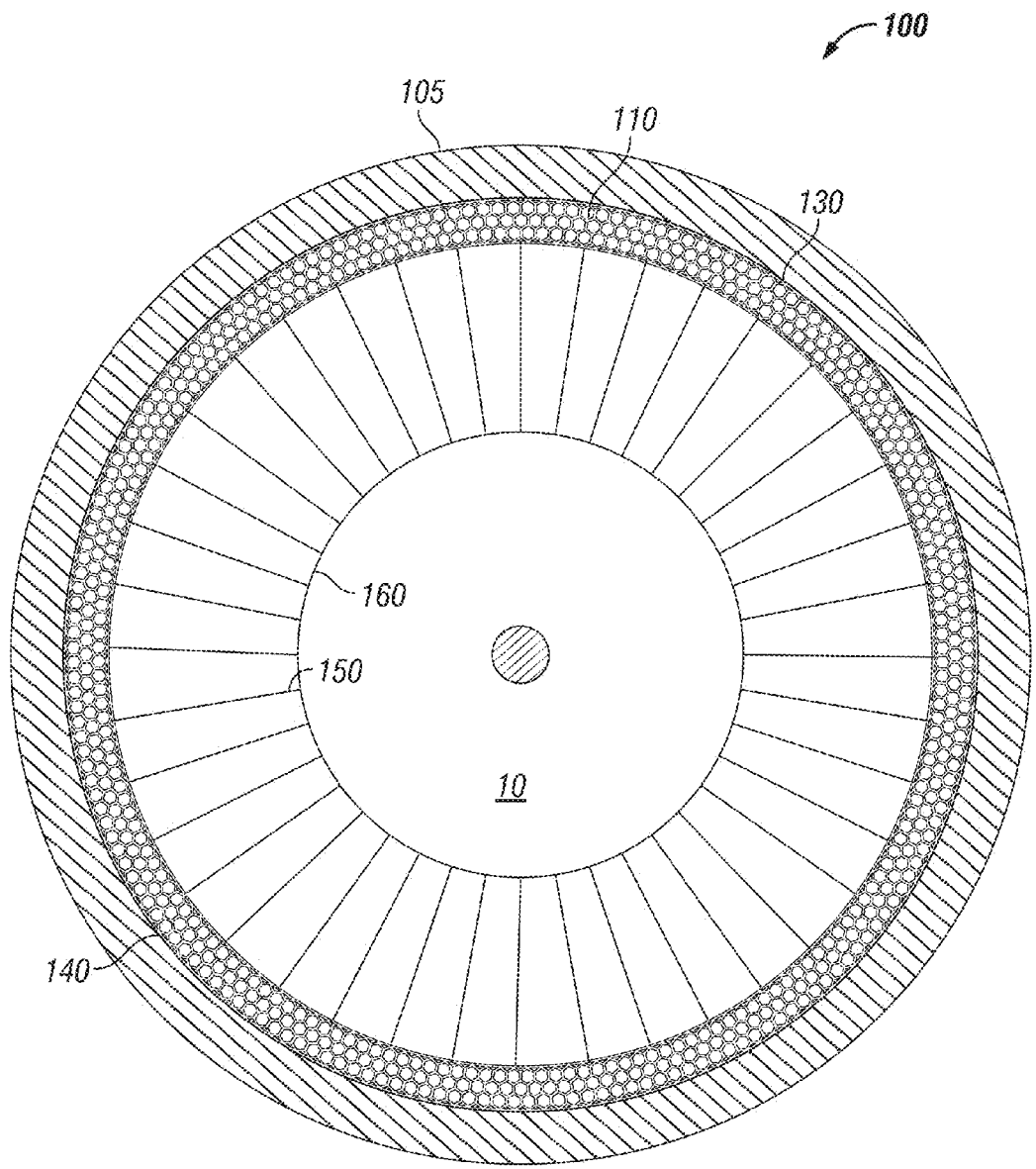
FIG. 19 is a front view of a tire that uses a Shear Layer having a Conventional Honeycomb Configuration with Cells where the Cell Angle $\theta$=60°.

The analytical expressions for the maximum effective strains, Equations (5), (6), and (7), are known to be restricted for linear elastic range. However, the in-plane shear behavior of honeycomb structures shows a linear relation between effective strains and stresses without severe local buckling and geometric nonlinearity (FIG. 19). This means that the current numerical parametric study provides accurate results related to our target application whose main loading mode is shear. More auxetic cell angles between −20° and −70° when h>1 are expected to provide a higher shear elongation but lower shear stiffness.

Concluding Remarks

In-plane Young's moduli ($E_{11}$ and $E_{22}$) and shear modulus ($G_{12}$) of conventional and auxetic hexagonal honeycombs with two base materials—PC and MS, were investigated under a given honeycomb meta-material height, H (=12.7 mm). Auxetic configurations have more unit cell height options than those of conventional hexagonal honeycombs due to the higher relative density of auxetic honeycombs in a given dimension. Both PC and MS present the possibility to tailor low shear stiffness honeycombs having 5 to 8 MPa shear moduli. Honeycomb structures with PC can be tailored with 0.4 to 1.3 mm cell wall thicknesses to target the shear moduli. On the other hand, MS honeycombs can be built with 0.2 mm or lower wall thicknesses to reach the target shear moduli. The MS design exhibits a considerable amount of cell wall thickness sensitivity to overall effective properties of honeycombs and the sensitivity increases with an increasing number of unit cells in the vertical direction. Therefore, a single unit cell design with MS is preferable to design low shear stiffness honeycombs in terms of the wall thickness sensitivity. Honeycombs with PC show lower wall thickness sensitivity than those with MS. PC auxetic honeycombs (θ=−20°) having about 5 MPa shear modulus can be stretched up to 15% effective shear strain. Auxetic honeycombs having negative Poisson's ratio show lower effective shear modulus and higher maximum effective shear strain than the regular counterparts, which means that the auxetic honeycombs are candidate geometries for a shear flexure design.

INDUSTRIAL APPLICATIONS

As can be seen, the present invention provides a suitable substitute for elastomeric materials such as rubber or polyurethane that are used in shear layer of a tire. Hence, a tire with lower mass, hysteresis and rolling resistance can be made.

Figure 20:
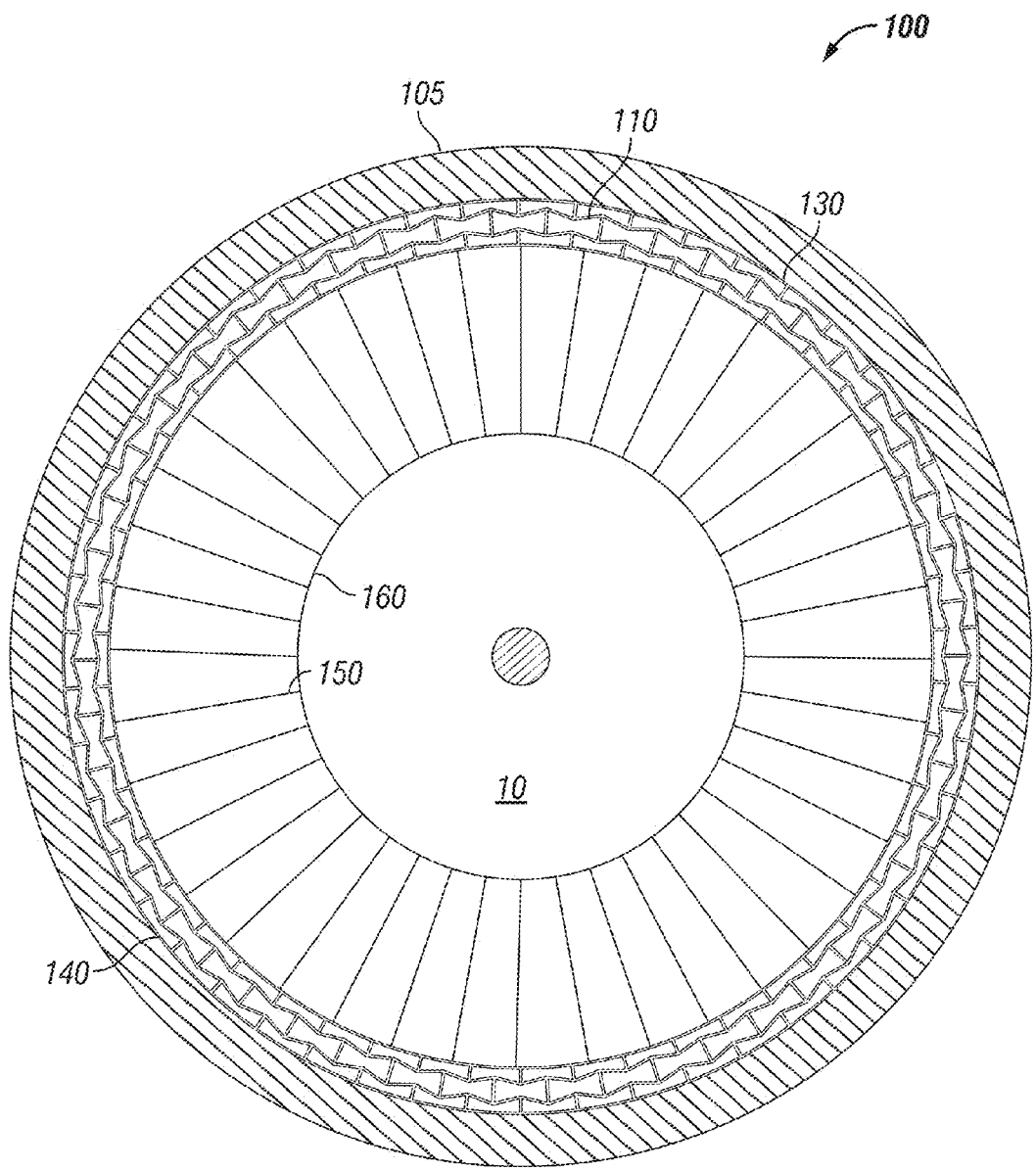
FIG. 20 is a front view of a tire that uses a Shear Layer having an Auxetic Honeycomb Configuration with Cells where the Cell Angle $\theta$=−10°.

Looking at FIG. 19, a tire 100 in accordance with the design disclosed by U.S. Pat. No. 7,201,194 is shown having a reinforced annular band 110 that has a shear layer with a conventional honeycomb design. On either side of the shear layer 110 are found inextensible membranes 130, 140. The reinforced annular band 110 is connected to the mounting band 160 by flexible spokes 150. The mounting band 160 in turn connects the tire to a hub or wheel 10. Also, a tread 105 is connected to the outward radial portion of the annular band 110. On the other hand, FIG. 20 shows a tire 100 with a reinforced annular band 110 that has a shear layer with an auxetic honeycomb configuration. When either tire is loaded with a force or load, the tread and annular band will flatten (not shown) to create a pressure distribution in the contact patch of the tire that is similar to that found in a pneumatic tire that lacks such a shear layer or annular band. While these embodiments are shown using spokes as disclosed by U.S. Pat. No. 7,201,194, it is equally contemplated that the honeycomb structures could be used in embodiments with solid sidewalls such as is disclosed by U.S. Pat. No. 6,769,465.

It should be understood that the present invention includes various other modifications that can be made to the exemplary embodiments described herein that come within the scope of the appended claims and their equivalents. These and other embodiments of the present invention are with the spirit and scope of the claims that now follow.

REFERENCES

[1] Sigmund, O., (2008), "Systematic Design of Metamaterials by Topology Optimization," in *IUTAM Symposium on Modeling Nanomaterials and Nanosystems*, Aalborg, Denmark. pp. 151-9.
[2] Gibson, L. J. and Ashby, M. F., (1997), *Cellular Solids Structure and Properties,* 2nd ed. Cambridge, UK: Cambridge University Press.
[3] Masters, I. G. and Evans, K. E., (1996), "Models for the Elastic Deformation of Honeycombs," *Composite Structures*, vol. 35, no. pp. 403-22,
[4] Bezazi, A., Scarpa, F., and Remillat, C., (2005), "A Novel Centresymmetric Honeycomb Composite Structure," *Composite Structures*, vol. 71, no. 536-64,
[5] Balawi, S. and Abot, J. L., (2008), "A Refined Model for the Effective in-Plane Elastic Moduli of Hexagonal Honeycombs," *Composite Structures*, vol. 84, no. pp. 147-58,
[6] Gonella, S. and Ruzzene, M., (2008), "Homogenization and Equivalent in-Plane Properties of Two Dimensional Periodic Lattices," *International Journal of Solid and Structures*, vol. 45, no. pp. 2897-915,
[7] Wang, A. J. and Mcdowell, D. L., (2004), "In-Plane Stiffness and Yield Strength of Periodic Metal Honeycombs," *Transactions of the ASME Journal of Engineering Materials and Technology*, vol. 126, no. pp. 137-56,
[8] Chung, J. and Wass, A. M., (1999), "Compressive Response and Failure of Circular Cell Polycarbonate Honeycombs under in-Plane Uniaxial Stresses," *Transactions of the ASME Journal of Engineering Materials and Technology*, vol. 121, no. pp. 494-502,

[9] Papka, S. and Kyriakides, S., (1998), "In-Plane Crushing of a Polycarbonate Honeycomb," *International Journal of Solid and Structures*, vol. 35, no. pp. 239-67,

[10] Scarpa, F., Blain, S., Perrott, D., Ruzzene, M., and Yates, J. R., (2007), "Elastic Buckling of Hexagonal Chiral Cell Honeycombs," *Composites Part A*, vol. 38, no. pp. 280-9,

[11] Torquato, S., Gibiansky, L. V., Silva, M. J., and Gibson, L. J., (1998), "Effective Mechanical and Transport Properties of Cellular Solids," *International Journal of Mechanical Science*, vol. 40, no. 1, pp. 71-82,

[12] Gellatry, R. A., Bijlaard, P. P., and Gallaherm, R. H., (1965), "Thermal Stress and Instability of Sandwich Cylinders on Rigid Supports," *Journal of Aircraft*, vol. 2, no. 1, pp. 44-8,

[13] Lin, W., (1996), "The Point Force Response of Sandwich Panels and Its Application to Impact Problems," in *37th Structures, Structural Dynamics, and Materials Conference*, AIAA/ASME/ASCE/AHS/ASC, Salt Lake City, Utah April.

[14] Becker, W., (2000), "Closed-Form Analysis of the Thickness Effect of Regular Honeycomb Core Material," *Composite Structures*, vol. 48, no. pp. 67-70,

[15] Kapania, R. K., Soliman, H. E., Vasudeva, S., Hughes, O., and Makjecha, D. P., (2008), "Static Analysis of Sandwich Panels with Square Honeycomb Core," *AIAA Journal* vol. 46, no. 3, pp. 627-34,

[16] Abdelal, G. F. and Atef, A., (2008), "Thermal Fatigue Analysis of Solar Panel Structure for Micro-Satellite Applications," *International Journal of Mechanics and Materials in Design*, vol. 4, no. pp. 53-62,

[17] Khire, R. A., Dessel, S. V., Messac, A., and Mullur, A. A., (2006), "Study of a Honeycomb-Type Rigidified Inflatable Structure for Housing," *Journal of Structural Engineering*, vol. 132, no. 10, pp. 1664-72,

[18] Olympio, K. R. and Gandhi, F., (2007), "Zero-Nu Cellular Honeycomb Flexible Skins for One-Dimensional Wing Morphing," in *48th Structures, Structural Dynamics, and Materials Conference*, AIAA/ASME/ASCE/AHS/ASC, Honolulu, Hi. April 23-26.

[19] Bubert, E. A., Woods, B. K. S., Kothera, C. S., and Wereley, N. M., (2008), "Design and Fabrication of a Passive 1d Morphing Aircraft Skin," in *49th Structures, Structural Dynamics, and Materials Conference*, AIAA/ASME/ASCE/AHS/ASC, Schaumburg, Ill. April 7-10.

[20] Seepersad, C. C., Allen, J. K., Mcdowell, D. L., and Mistree, F., (2008), "Multifunctional Topology Design of Cellular Material Structures," *Journal of Mechanical Design*, vol. 130, no. pp. 031404-13,

[21] Huang, J. S. and Gibson, L. J., (1999), "Microstructural Design of Cellular Materials—I: Honeycomb Beams and Plates," *Acta Metallurgica et Materialia*, vol. 43, no. pp. 1643-50,

[22] Papka, S. and Kyriakides, S., (1994), "In-Plane Compressive Response and Crushing of Honeycomb," *Journal of Mechanical Physics Solids*, vol. 42, no. 10, pp. 1499-1532,

[23] Atli, B. and Gandhi, F., (2008), "Energy Absorption of Cellular Honeycombs with Various Cell Angles under in-Plane Compressive Loading," in *49th Structures, Structural Dynamics, and Materials Conference*, AIAA/ASME/ASCE/AHS/ASC, Schaumburg, Ill. April 7-10.

[24] Ashby, M. F., (1999), *Materials Selection and Process in Mechanical Design*: Butterworth-Heinermann.

What is claimed is:

1. A tire, comprising:
a shear band comprising a shear layer with a honeycomb structures having at least one cell with a cell height, cell wall thickness and a cell angle, a first membrane adhered to a radially inward extent of the shear layer and a second membrane adhered to a radially outward extent of the shear layer; and
a plurality of web spokes that extend transversely across and radially inward from the first membrane and that connect the shear layer and the first and second membranes to a hub.

2. The tire of claim 1, wherein said cell has a six-sided conventional configuration.

3. The tire of claim 1, wherein said cell has a six-sided auxetic configuration.

4. The tire of claim 1, wherein the shear layer is made from a ductile material.

5. The tire of claim 1, wherein the shear layer is made of a brittle material.

6. The tire of claim 5, wherein the shear layer is made of mild steel.

7. The tire of claim 1, wherein the height of the shear layer is approximately half an inch.

8. The tire of claim 1, wherein the cell wall thickness ranges from 0.4 to 1.3 mm.

9. The tire of claim 5, wherein the shear layer is made of polycarbonate.

10. The tire of claim 1, wherein the cell wall thickness is 0.2 mm or less.

11. The tire of claim 1, wherein the shear layer is made of mild steel.

12. The tire of claim 1, wherein the cell angle is approximately −10 degrees.

13. The tire of claim 12, wherein the cell height is 7.7 mm, 3.8 mm or 2.6 mm.

14. The tire of claim 1, wherein the cell angle is 60 degrees.

15. The tire of claim 14, wherein the cell height is 3.4 mm.

16. The tire of claim 1, wherein the shear band exhibits a 5-8 MPa shear modulus and 15% or lower shear strain when subjected to stress.

17. The tire of claim 1, further comprising a tread that is adhered to the radially outward extent of the second membrane.

18. The tire of claim 1, wherein the membranes are inextensible.

19. A tire, comprising:
a shear band comprising a shear layer with a honeycomb structures having at least one auxetic cell with a cell height, cell wall thickness and a cell angle, a first membrane adhered to a radially inward extent of the shear layer and a second membrane adhered to a radially outward extent of the shear layer; and
a plurality of web spokes that extend transversely across and radially inward from the first membrane and that connect the shear layer and the first and second membranes to a hub.

20. The tire of claim 19, wherein the auxetic cell has an approximately −10 degrees cell angle.

21. The tire of claim 19, wherein the shear band exhibits a 5-8 MPa shear modulus and 15% or lower shear strain when subjected to stress.

* * * * *